United States Patent
Higurashi

(10) Patent No.: US 8,243,188 B2
(45) Date of Patent: Aug. 14, 2012

(54) IMAGING APPARATUS

(75) Inventor: Masaki Higurashi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 594 days.

(21) Appl. No.: 12/471,071

(22) Filed: May 22, 2009

(65) Prior Publication Data

US 2010/0110278 A1    May 6, 2010

(30) Foreign Application Priority Data

Oct. 30, 2008    (JP) ................. 2008-279588
Oct. 30, 2008    (JP) ................. 2008-279589

(51) Int. Cl.
     *G03B 13/00*      (2006.01)
     *G03B 17/00*      (2006.01)
     *H04N 5/232*      (2006.01)

(52) U.S. Cl. .................. 348/345; 348/349; 396/529

(58) Field of Classification Search ........... 348/345, 348/347, 349, 351, 360, 361; 396/72, 77, 396/79, 80, 82, 529

See application file for complete search history.

(56) References Cited

U.S. PATENT DOCUMENTS

2008/0007644 A1*   1/2008   Matsumoto ............ 348/345
2009/0256951 A1*   10/2009   Yumiki .................. 348/345

FOREIGN PATENT DOCUMENTS

| JP | 2-135406 | 5/1990 |
|---|---|---|
| JP | 2007-228047 | 9/2007 |
| JP | 2007-322922 | 12/2007 |

* cited by examiner

*Primary Examiner* — Alicia M Harrington
(74) *Attorney, Agent, or Firm* — Straub & Pokotylo; John C. Pokotylo

(57) ABSTRACT

An imaging apparatus of the invention comprises a camera body and a lens unit which can be mounted on and removed from the camera body. The focusing lens of the lens unit is moved along the optical axis. The position of the focusing lens on the optical axis is detected by a position detection section in response to a synchronization signal according to the photographic timing of the imaging device. A second transmission section transmits position data on the focusing lens detected by the position detection section to the camera body.

17 Claims, 17 Drawing Sheets

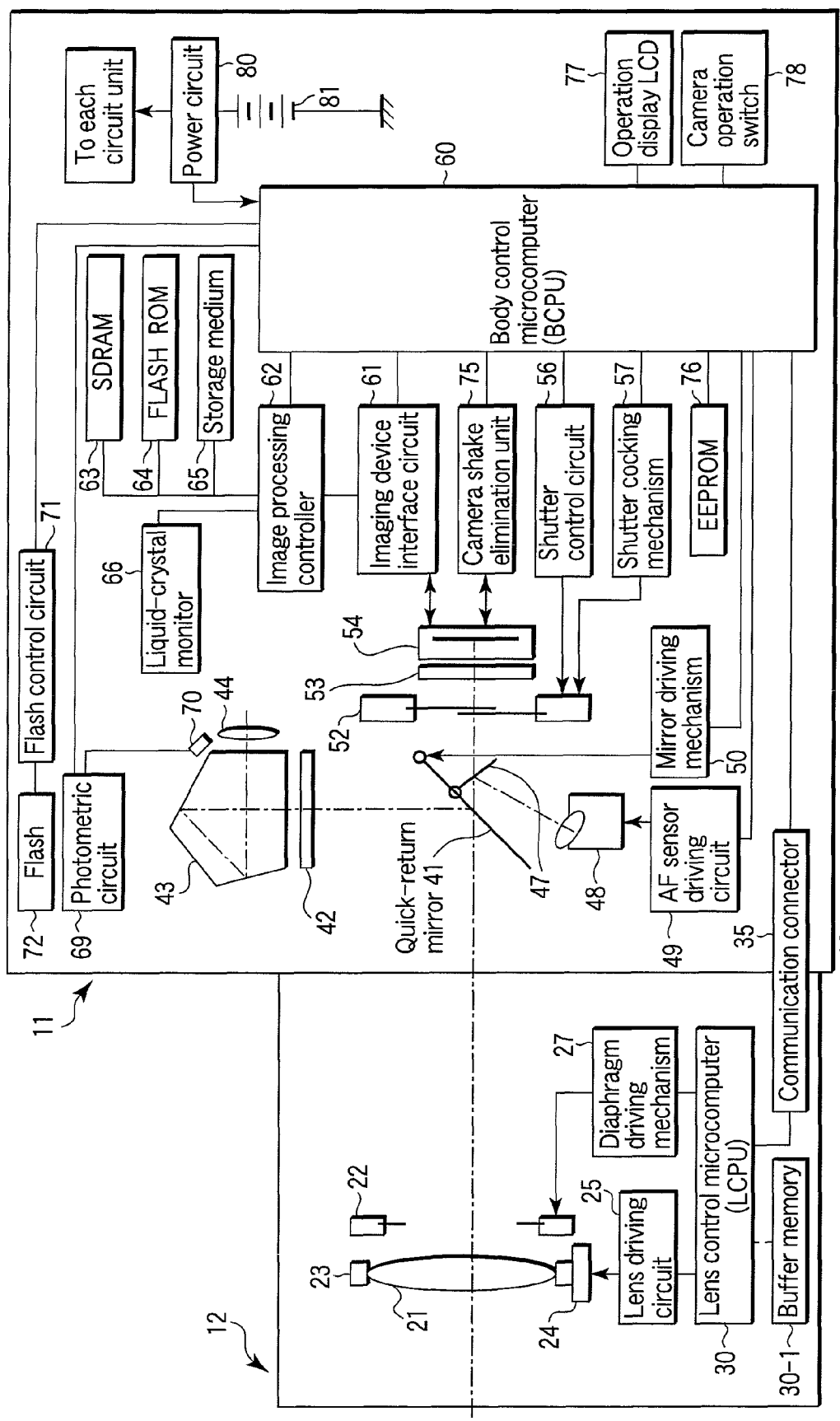
F I G. 1

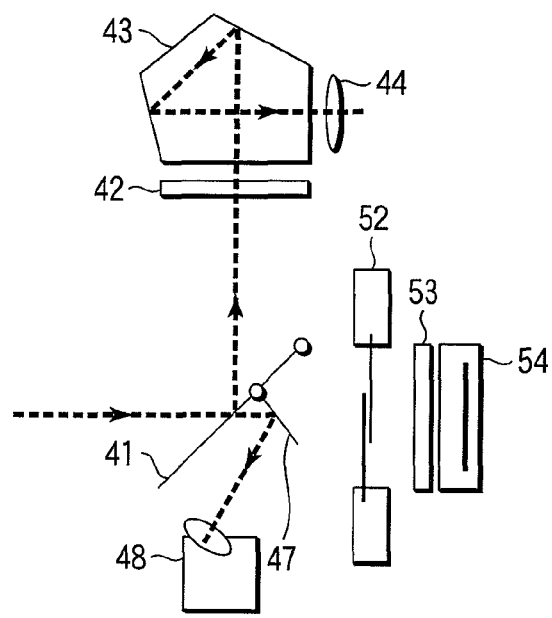
F I G. 2A
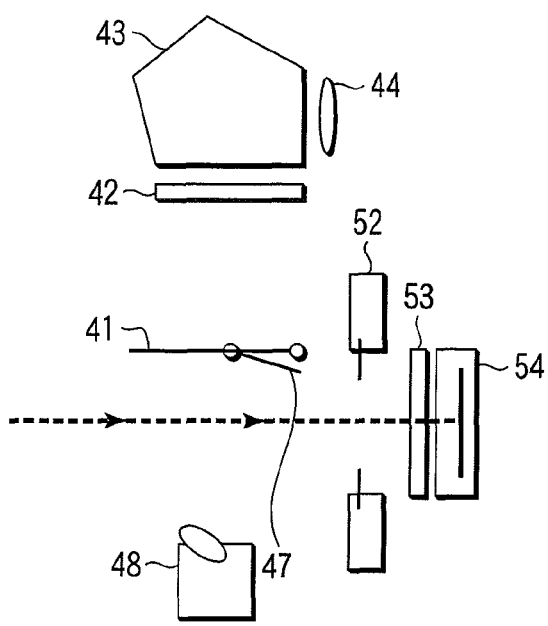
F I G. 2B

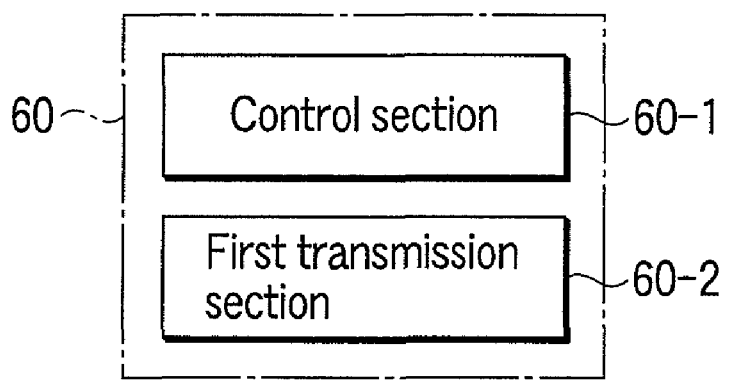
F I G. 3
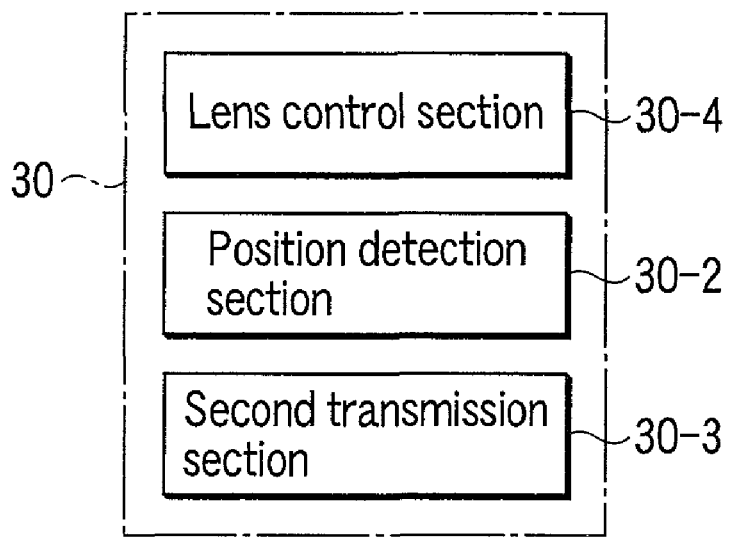
F I G. 4

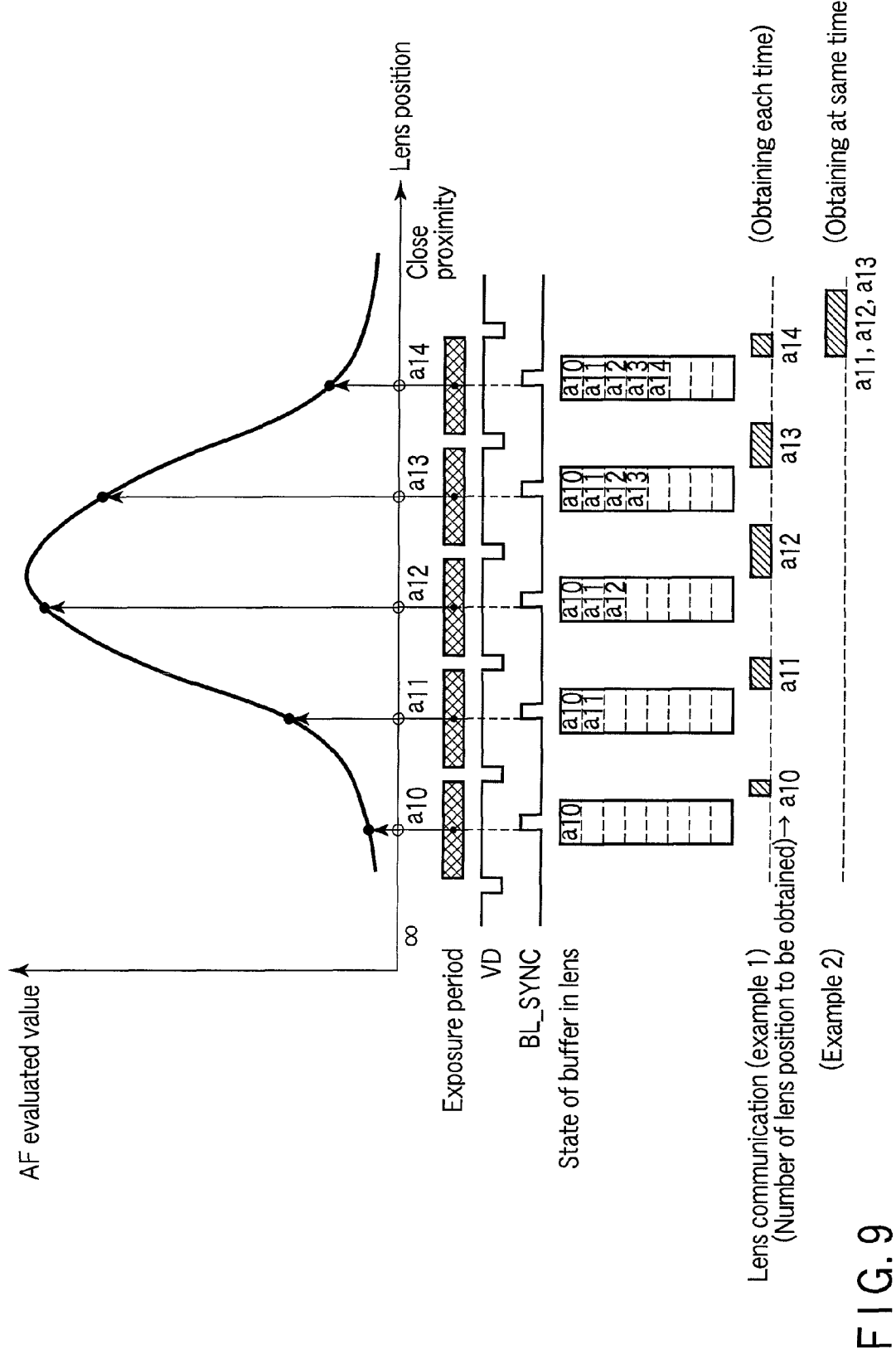
F I G. 9

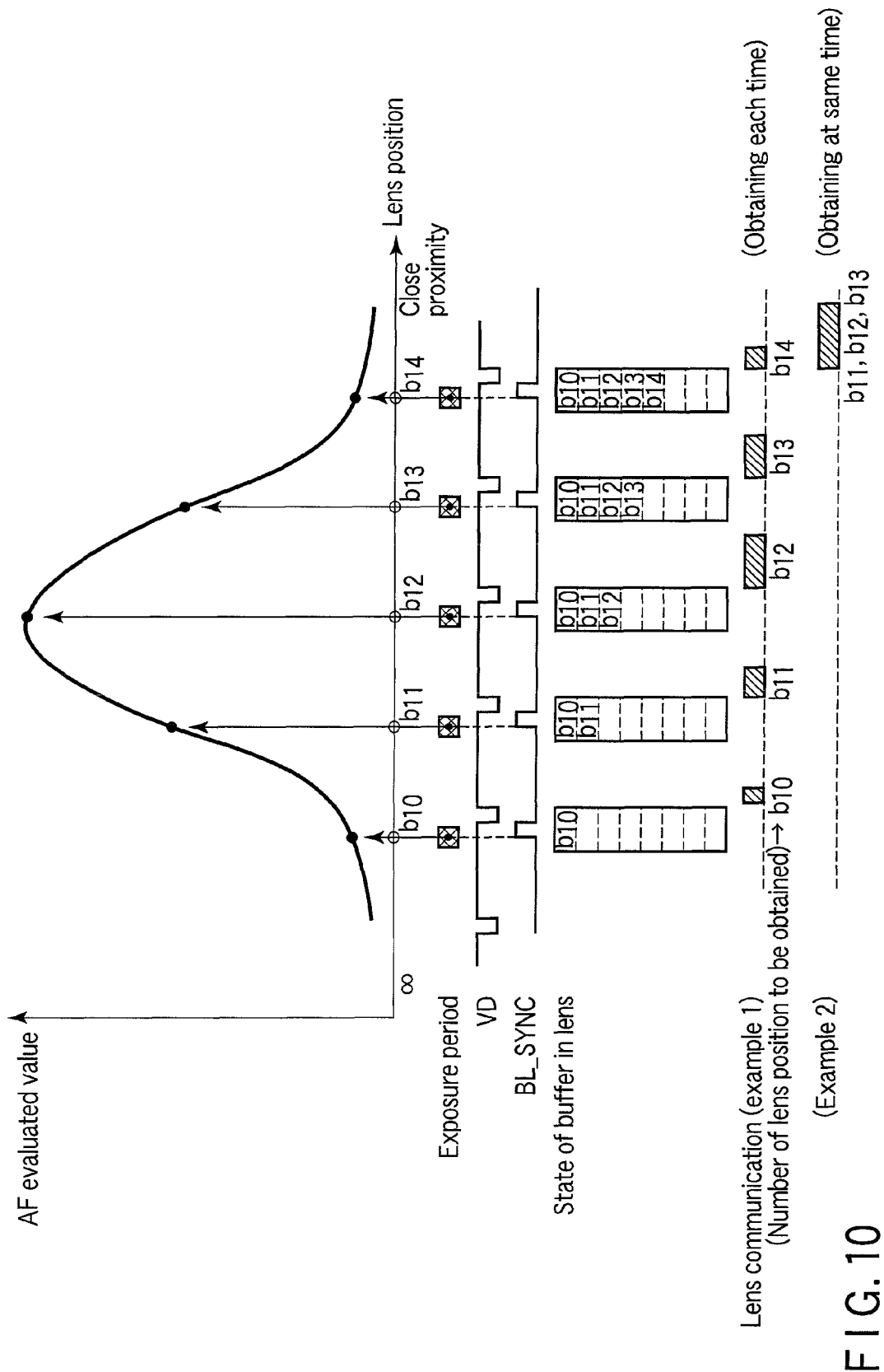
F I G. 10

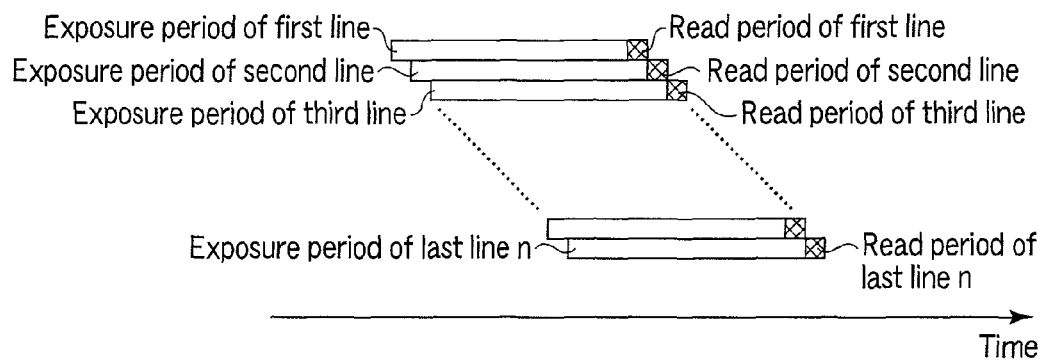
F I G. 11A
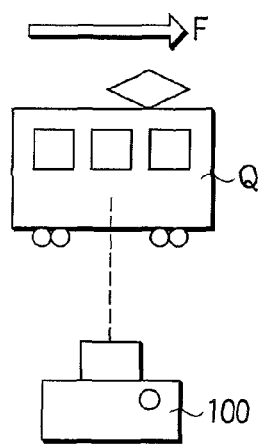
F I G. 11B
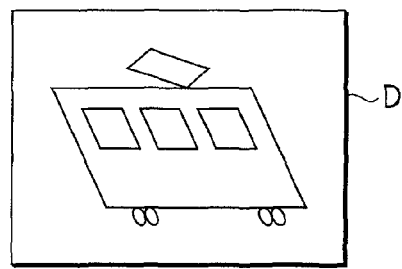
F I G. 11C

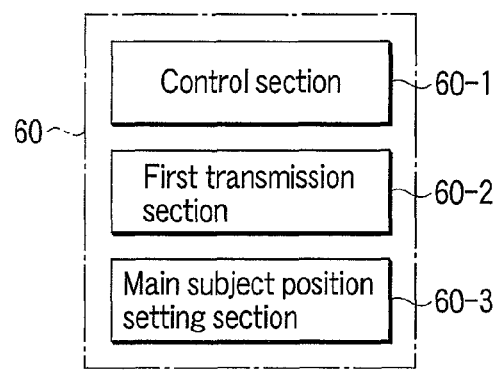
FIG. 12
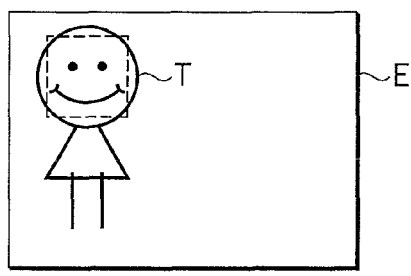 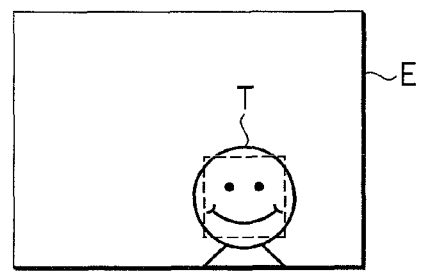
FIG. 13A  FIG. 13B
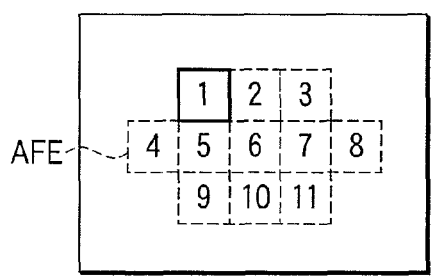 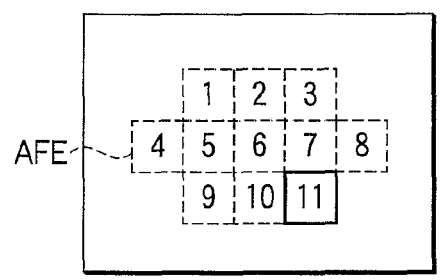
FIG. 14A  FIG. 14B

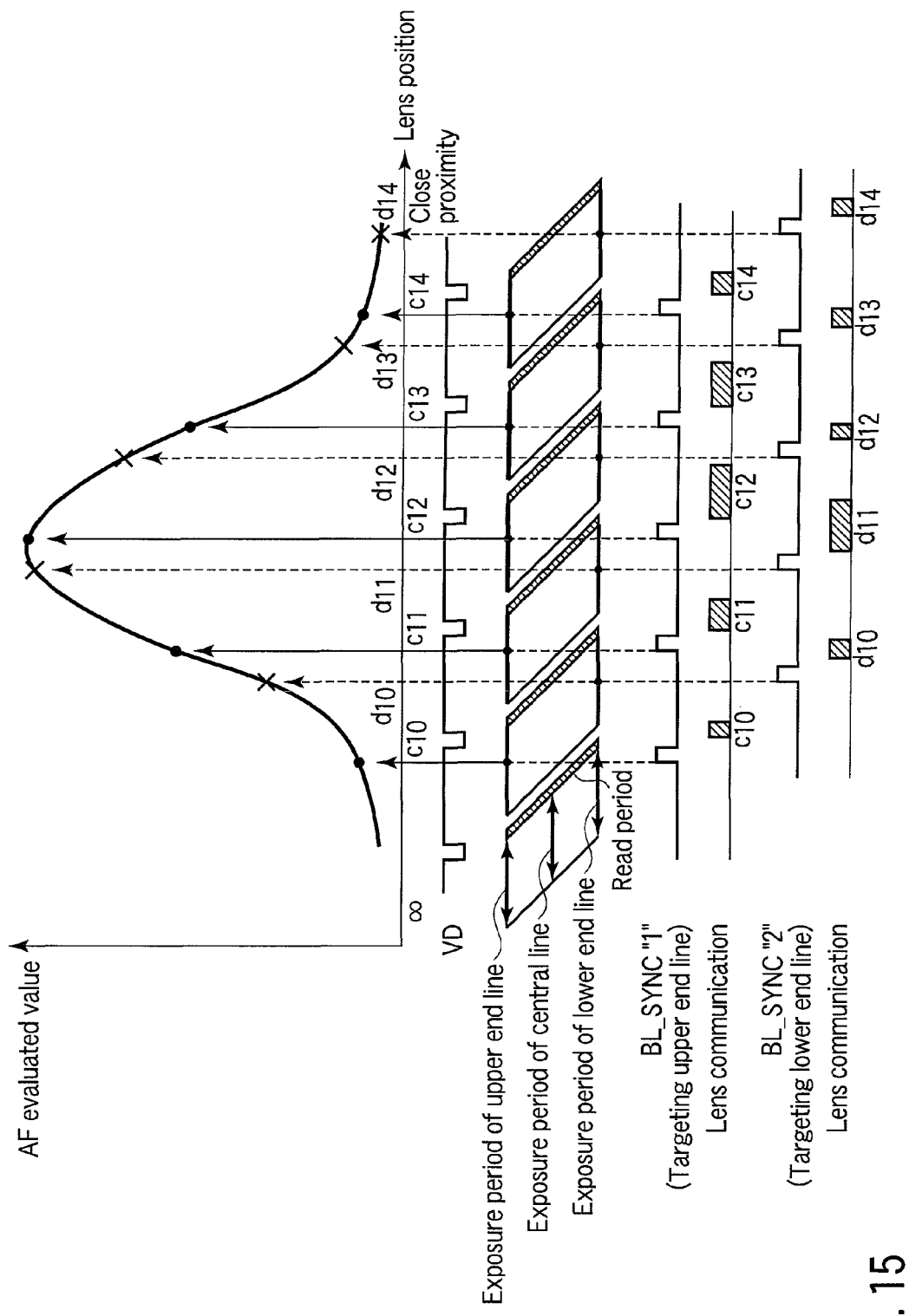
F I G. 15

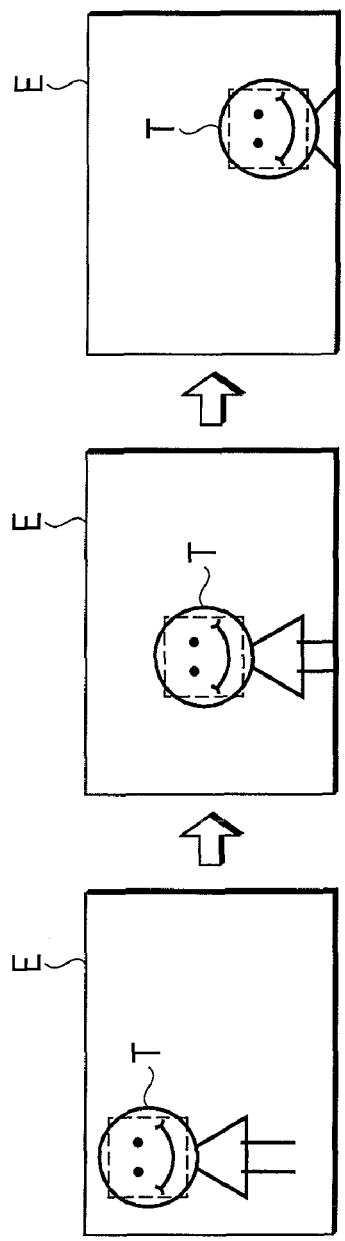
F I G. 16A
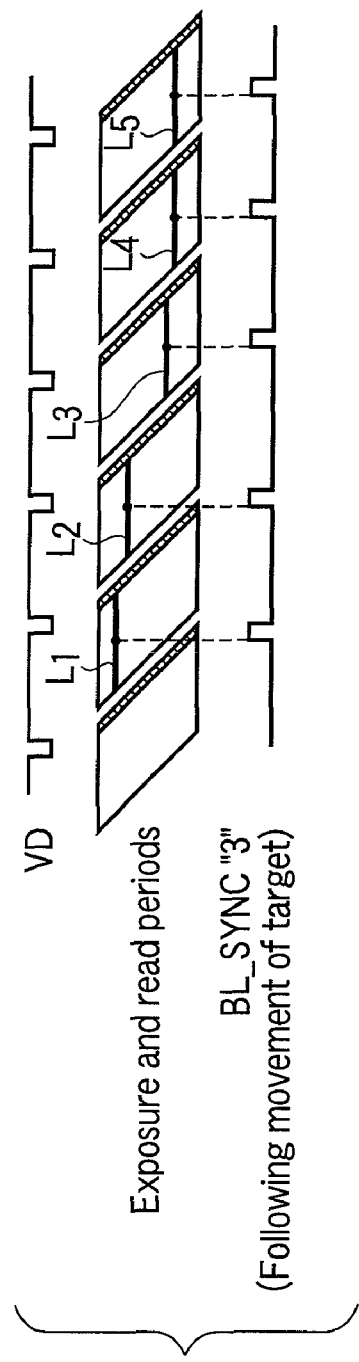
F I G. 16B

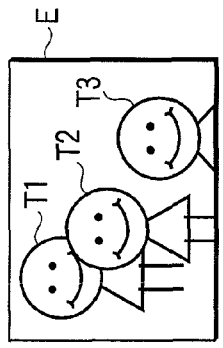
F I G. 17A
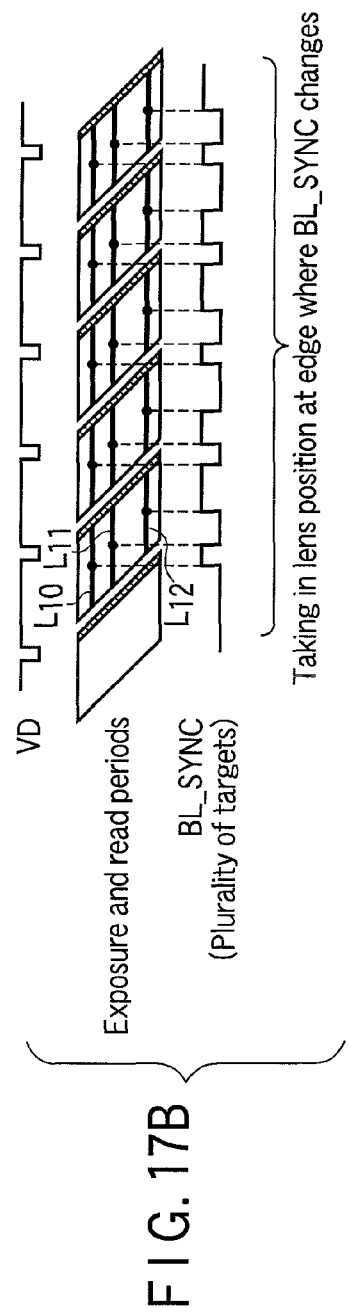
F I G. 17B
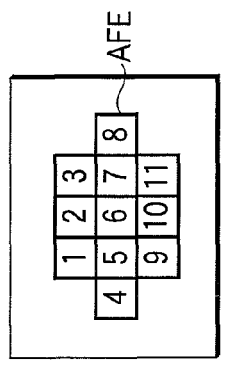
F I G. 17C

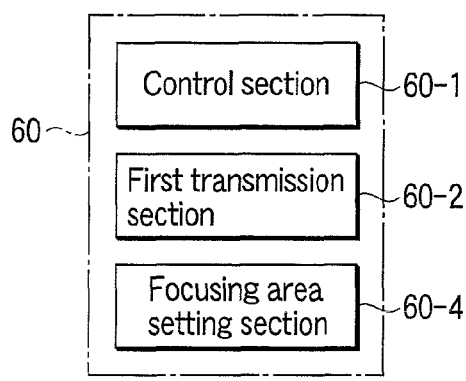
F I G. 18
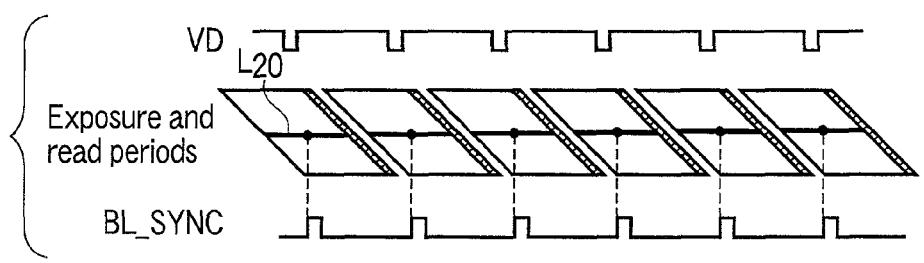
F I G. 19

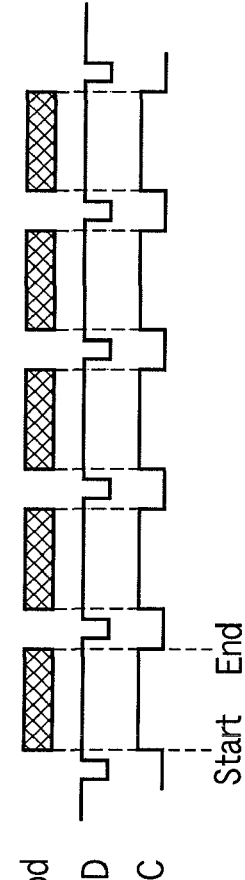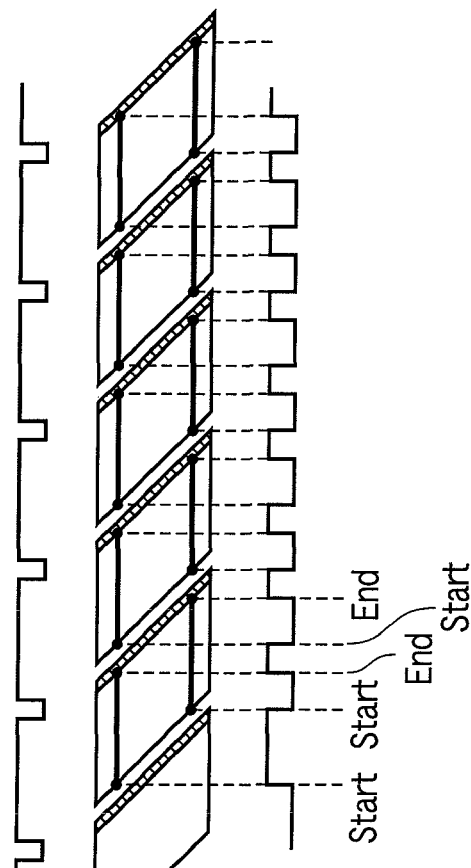

IMAGING APPARATUS

CROSS-REFERENCE TO RELATED APPLICATIONS

This application is based upon and claims the benefit of priority from prior Japanese Patent Applications No. 2008-279588, filed Oct. 30, 2008; and No. 2008-279589, filed Oct. 30, 2008, the entire contents of both of which are incorporated herein by reference.

BACKGROUND OF THE INVENTION

1. Field of the Invention

This invention relates to an imaging apparatus which comprises a camera body and a lens unit (an interchangeable lens unit) capable of being mounted on and removed from the camera body and which photographs a subject image via the lens unit on the camera body side.

2. Description of the Related Art

One known imaging apparatus is a camera with interchangeable lenses which comprises a camera body and a lens unit capable of being mounted on and removed from the camera body. The lens unit includes a focusing lens for adjusting the focal position to bring a subject image into focus. The camera body is provided with an imaging device which photographs a subject image formed by the lens unit. For example, Jpn. Pat. Appln. KOKAI Publication No. 2-135406 has disclosed a camera system which effects communication between the camera body and the interchangeable lenses in synchronization with the vertical synchronization signal of the imaging device. Jpn. Pat. Appln. KOKAI Publication No. 2007-228047 has disclosed use of a CMOS sensor as an imaging device in a recent digital camera.

Such an imaging device performs a contrast autofocus (AF) operation in photographing the subject image. In contrast AF, the contrast value (AF evaluated value) in an A area of the photographed image is obtained on the basis of the output signal of the imaging device, while the position of the focusing lens is being changed. The position where the contrast value is the largest is set as the in-focus position.

BRIEF SUMMARY OF THE INVENTION

According to a first aspect of the invention, there is provided an imaging apparatus comprising: a camera body; and a lens unit which has a focusing lens for adjusting a focal position to bring a subject image into focus and which can be mounted on and removed from the camera body, the camera body including an imaging device which photographs a subject image formed by the lens unit, a control section for generating an instruction to provide movement control of the focusing lens along an optical axis, and a first transmission section for transmitting to the lens unit the instruction generated by the control section and a synchronization signal in response to the photographic timing of the imaging device, and the lens unit including a lens control section for moving the focusing lens along the optical axis according to the instruction generated by the control section, a position detection section for detecting the position of the focusing lens on the optical axis in response to the synchronization signal, and a second transmission section for transmitting position data on the focusing lens detected by the position detection section to the camera body.

According to a second aspect of the invention, there is provided an imaging apparatus comprising: a camera body; and a lens unit which has a focusing lens for adjusting a focal position to bring a subject image into focus and which can be mounted on and removed from the camera body, the camera body including an imaging section which has pixels including imaging devices arranged in a plurality of lines, each line including a plurality of imaging devices, and which takes a picture so as to shift an exposure period at intervals of a specific number of lines, a control section for generating an instruction to provide movement control of the focusing lens along an optical axis to perform focusing, a first transmission section for transmitting to the lens unit the instruction generated by the control section and a synchronization signal in response to specific exposure timing of the imaging device, and a subject data acquisition section for acquiring data on a subject on the basis of an imaging output of the imaging device, and the lens unit including a lens control section for moving the focusing lens along the optical axis according to the instruction generated by the control section, a position detection section for detecting the position of the focusing lens on the optical axis in response to the synchronization signal, and a second transmission section for transmitting position data on the focusing lens detected by the position detection section to the camera body, wherein the control section performs focusing by controlling the movement of the focusing lens along the optical axis on the basis of the position data on the focusing lens, and the first transmission section sets the timing of the synchronization signal on the basis of the data on the subject acquired by the subject data acquisition section.

According to a third aspect of the invention, there is provided an imaging apparatus comprising: a camera body; and a lens unit which has a focusing lens for adjusting a focal position to bring a subject image into focus and which can be mounted on and removed from the camera body, the camera body including an imaging section which has pixels including imaging devices arranged in a plurality of lines, each line including a plurality of imaging devices, and which takes a picture so as to shift an exposure period at intervals of a specific number of lines, a control section for generating an instruction to provide movement control of the focusing lens along an optical axis to perform focusing, a first transmission section for transmitting to the lens unit the instruction generated by the control section and a synchronization signal in response to specific photographic timing of the imaging device, and a focusing area setting section for setting an area where focusing is performed in a photographic area of the imaging device, and the lens unit including a lens control section for moving the focusing lens along the optical axis according to the instruction generated by the control section, a position detection section for detecting the position of the focusing lens on the optical axis in response to the synchronization signal, and a second transmission section for transmitting position data on the focusing lens detected by the position detection section to the camera body, wherein the control section performs focusing by controlling the movement of the focusing lens along the optical axis on the basis of the position data on the focusing lens, and the first transmission section sets the timing of the synchronization signal on the basis of the area where the focusing is performed set by the focusing area setting section.

BRIEF DESCRIPTION OF THE SEVERAL VIEWS OF THE DRAWING

FIG. 1 is a block configuration diagram of an imaging apparatus according to a first embodiment of the invention;

FIG. 2A is a diagram to explain an operation when an optical finder with a quick-return mirror of the imaging device in the DOWN position is used;

FIG. 2B is a diagram to explain an operation when a live view with the quick-return mirror in the UP position is used;

FIG. 3 is a functional block diagram of a body control microcomputer (BCPU) of the imaging apparatus;

FIG. 4 is a functional block diagram of a lens control microcomputer (LCPU) of the imaging apparatus;

FIG. 9 is a diagram showing the timing of acquiring position data on the focusing lens in a normal exposure period of the imaging apparatus;

FIG. 10 is a diagram showing the timing of acquiring position data on the focusing lens in a short exposure period of the imaging apparatus;

FIG. 11A is a schematic diagram to help explain the operation of the rolling shutter of an imaging device unit of an imaging apparatus according to a second embodiment of the invention;

FIG. 11B shows an example of a subject in motion to be photographed by the imaging apparatus;

FIG. 11C shows an example of an image obtained by photography with the imaging apparatus;

FIG. 12 is a functional block diagram of a body control microcomputer (BCPU) in the imaging apparatus;

FIG. 13A shows the position where a main subject area is within a photographic area in the imaging apparatus;

FIG. 13B shows the position where the main subject area is within the photographic area in the imaging apparatus;

FIG. 14A shows an example of an AF area set in the upper part of the photographic screen in the imaging apparatus;

FIG. 14B shows an example of the AF area set in the lower part of the photographic screen in the imaging apparatus;

FIG. 15 is a diagram showing the timing of acquiring position data on the focusing lens when a rolling shutter is used in the imaging apparatus;

FIG. 16A shows the way the main subject moves in the photographic area as time advances in the imaging apparatus;

FIG. 16B shows a synchronization signal when the main subject moves in the photographic area in the imaging apparatus;

FIG. 17A shows a photographic area where there are a plurality of main subjects in the imaging apparatus;

FIG. 17B is a diagram showing the timing of acquiring position data corresponding to a synchronization signal when there are a plurality of main subjects in the imaging apparatus;

FIG. 17C shows an AF area of the photographic screen when multi AF is performed in the imaging apparatus;

FIG. 18 is a functional block diagram of a body control microcomputer (BCPU) when spot AF has been set in the imaging apparatus;

FIG. 19 is a diagram showing the timing of acquiring position data on the focusing lens when the spot AF has been set in the imaging apparatus;

FIG. 20 shows the timing of an exposure period when a global shutter is used in the imaging apparatus;

FIG. 21 shows the timing of an exposure period when a rolling shutter is used in the imaging apparatus;

DETAILED DESCRIPTION OF THE INVENTION

Figure 5:
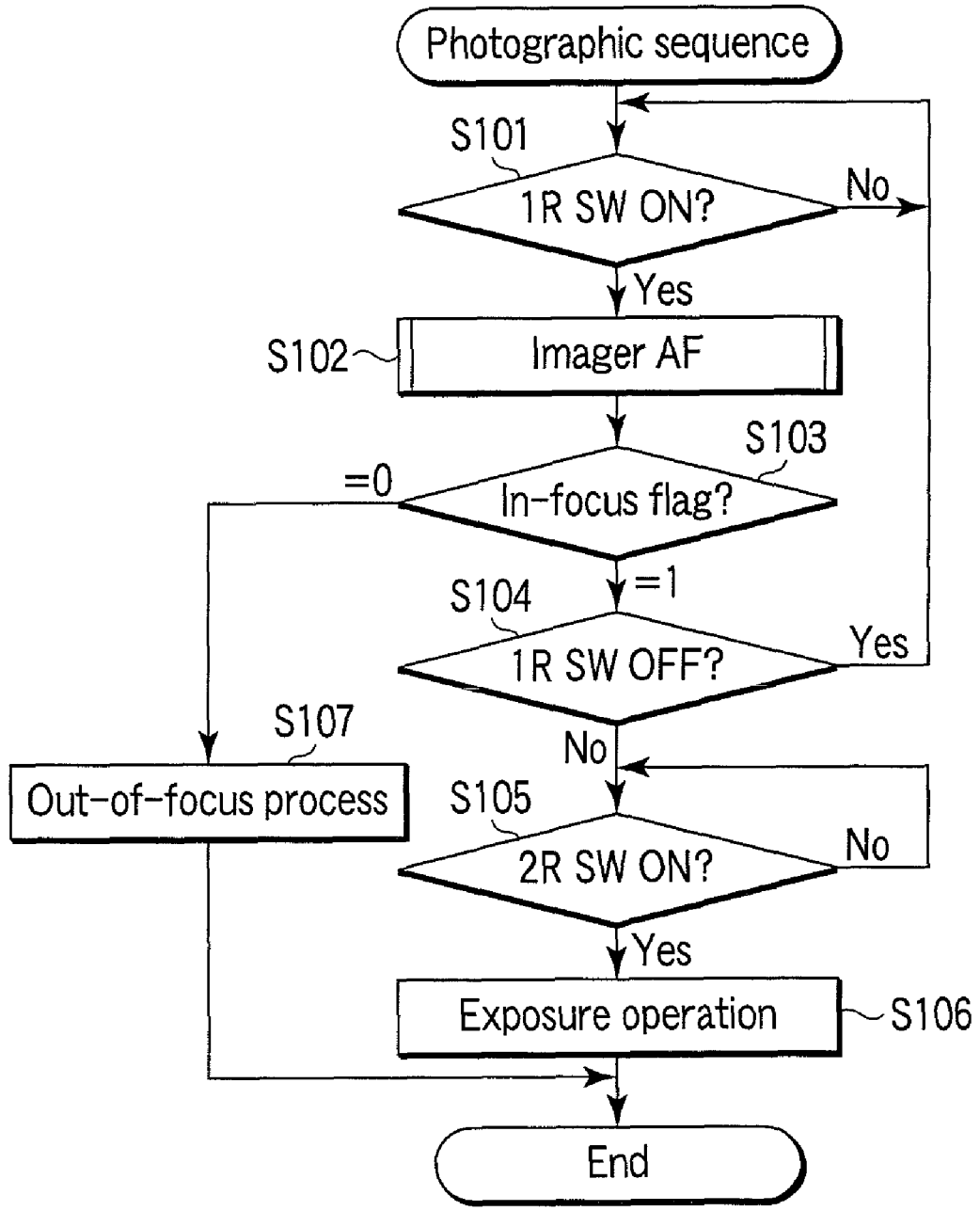
FIG. 5 is a photography flowchart for a photographic sequence of the imaging device.

Hereinafter, referring to the accompanying drawings, a first embodiment of the invention will be explained.

FIG. 1 is a block configuration diagram of an imaging apparatus 10 according to a first embodiment of the invention. The imaging apparatus 10 comprises a body unit 11 and an interchangeable lens unit (or body tube) 12 as an accessory device.

The lens unit 12 can be mounted on and removed from the body unit 11 via a lens mount provided on the front face of the body unit 11. The lens unit 12 is composed of a photographic lens 21 acting as a focusing lens, a diaphragm 22, a lens frame 23, a lens driving mechanism 24, a lens driving circuit 25, a diaphragm driving mechanism 27, and a lens control microcomputer (hereinafter, abbreviated as LCPU) 30.

The photographic lens 21 is supported by the lens frame 23. The lens frame 23 is moved along an optical axis P by the driving of a DC motor in the lens driving mechanism 24. The lens driving mechanism 24 moves the lens frame 23 according to a control signal from the LCPU 30 via the lens driving circuit 25 so as to move the photographic lens 21 along the optical axis P. The diaphragm 22 is driven by a stepping motor in the diaphragm driving mechanism 27.

The LCPU 30 provides driving control of each part of the lens unit 12, including the lens driving mechanism 24 and diaphragm driving mechanism 27. The LCPU 30, which is connected electrically to a body control microcomputer (hereinafter, abbreviated as BCPU) 60 of the body unit 11, is controlled under the control of the body control microcomputer 60. The LCPU 30 has a buffer memory 30-1 as a storage section for storing, for example, a plurality of items of position data on the photographic lens 21 sequentially.

In the body unit 11, a quick-return mirror 41 is provided. The quick-return mirror 41 is provided on the optical axis P of the photographic lens 21 of the lens unit 12. On the reflected light path of the quick-return mirror 41, there are provided a focusing screen 42 and a pentaprism 43. On the reflected light path of the pentaprism 43, an eyepiece 44 is provided.

The incoming beam of light from the subject via the photographic lens 21 and diaphragm 22 of the lens unit 12 is reflected by the quick-return mirror 41, passes through the focusing screen 42 and pentaprism 43, and reaches the eyepiece 44.

Behind the quick-return mirror 41, there are provided a focal plane shutter 52 on the optical axis P, an optical low-pass filter 53, and an imaging device (CCD) unit 54. The imaging device unit 54 photoelectrically converts the subject image passed through the optical system, including the photographic lens 21 of the lens unit 12.

The central part of the quick-return mirror 41 is formed into a half mirror. The quick-return mirror 41 is moved to either the DOWN position as shown in FIG. 2A or the UP position as shown in FIG. 2B by the driving of a mirror driving mechanism 50.

When the quick-return mirror 41 is in the DOWN position, the incoming beam of light from the subject via the photographic lens 21 and diaphragm 22 in the lens unit 12 is reflected by the quick-return mirror 41 as shown in FIG. 2A, passes through the focusing screen 42 and pentaprism 43, and reaches the eyepiece 44 as described above. At the same time, a part of the beam of light from the subject passes through the quick-return mirror 41. The transmitted beam of light is reflected by a sub-mirror 47 provided on the quick-return mirror 41 and then is directed to an AF (auto focus) sensor unit 48 for automatic focus detection.

When the quick-return mirror 41 is in the UP position, the sub-mirror 47 is folded back as shown in FIG. 2B. When the quick-return mirror 41 is in the UP position, the beam of light passed through the photographic lens 21 passes through a shutter 52 and the optical low-pass filter (OLPF) 53, and forms an image on the imaging area of the imaging device unit 54.

The optical low-pass filter 53 is provided between the imaging device unit 54 and shutter 52. The shutter 52 is provided in front of the optical low-pass filter 53. The shutter 52 cuts off the beam of light directed from the photographic lens 21 to the imaging device unit 54 unless photography is carried out.

In the body unit 11, there are provided an AF sensor driving circuit 49, the mirror driving mechanism 50, a shutter control circuit, 56, and a shutter cocking mechanism 57. The AF sensor driving circuit 49 drives the AF sensor unit 48. The mirror driving mechanism 50 drives the quick-return mirror 41. The shutter control circuit 56 controls the movements of the front and rear blinds of the shutter 52. The shutter cocking mechanism 57 tensions springs that drive the front and rear blinds.

In the body unit 11, there are provided an imaging device interface circuit 61, an SDRAM 63 and a flash ROM 64 which are provided as storage areas, a storage medium 65, a liquid-crystal monitor 66, and an image processing controller 63 for processing images. The imaging device interface circuit 61 is connected to the CCD of the imaging device unit 54.

The imaging device interface circuit 61, SDRAM 63, flash ROM 64, storage medium 65, and liquid-crystal monitor 66 are connected to the image processing controller 62. These are configured to provide not only an electronic imaging function but also an electronic image display function.

The recording medium 65 is an external storage medium, such as an arbitrary type of memory card or an external hard disk drive (HDD). The storage medium 65, which can communicate with the body unit 11 of the camera, is mounted on the body unit 11 in an interchangeable manner.

Connected to the BCPU 60 are a communication connector 35, a photometric circuit 69, the AF sensor driving circuit 49, the mirror driving mechanism 50, the shutter control circuit 56, the shutter cocking mechanism 57, the image processing controller 62, a flash control circuit 71, a camera shake elimination unit 75, an EEPROM 76 composed of a nonvolatile memory, and others.

Under the control of the BCPU 60, the image processing controller 62 controls the imaging device interface circuit 61 to take in image data from the imaging device unit 54. The image data is converted by the image processing controller 62 into a video signal, which is displayed on the liquid-crystal monitor 66. The photographer can check the photographed image from the displayed image on the liquid-crystal monitor 66.

The SDRAM 63 is a memory for storing image data temporarily. The SDRAM 63 is used as a work area or the like in converting image data. The image data is set so as to be converted into JPEG data by various image processes and then stored in the storage medium 65.

Connected to the BCPU 60 are an operation display LCD 77, a camera operation switch (SW) 78, and a battery 81 via a power circuit 80. With the display output, the operation display LCD 77 informs the photographer of the operating state of the apparatus.

The BCPU 60 and LCPU 30 are electrically connected via the communication connector 35 so as to be capable of communication between them when the lens unit 12 is mounted. The LCPU 30 operates in dependent cooperation with the BCPU 60.

The photometric circuit 69 performs a photometric process on the basis of a output from a photometric sensor 70 provided near the pentaprism 43.

The flash control circuit 71 causes the flash 72 acting as a flash emission unit to emit light under the control of the BCPU 60.

The camera shake elimination unit 75 moves the imaging device unit 54 in a specific direction under the control of the BCPU 60, thereby eliminating the influence of camera shake for photographed image.

The EEPROM 76, which functions as another memory that stores specific control parameters necessary to control the camera, is so configured that it can be accessed by the BCPU 60.

The camera operation switch 78 is composed of a switch group made up of a plurality of switches. The switch group includes, for example, a release switch for specifying the execution of a photographic operation, a mode change switch for switching between the photographic mode and the image display mode, and a power switch. The switch group includes operation keys necessary to operate the camera. The release switch provides a half-press operation or a first release switch (1RSW) operation and a full-press operation or a second release switch (2RSW) operation.

The power circuit 80 converts the voltage of the battery 81 into a voltage needed by each circuit unit constituting the apparatus and supplies the converted voltage.

The BCPU 60 of the body unit 11 and the LCPU 30 of the lens unit 12 have the following functions.

The BCPU 60 has the function of a control section 60-1 and that of a first transmission section 60-2 as shown in FIG. 3. The control section 60-1 generates an instruction to move the photographic lens 21 of the lens unit 12 along the optical axis P.

The first transmission section 60-2 transmits to the lens unit 12 the instruction generated by the control section 60-1 and a synchronization signal BL_SYNC according to the photographic timing of the imaging device unit 54. It goes without saying that the first transmission section 60-2 can also communicate in a conventional manner.

Specifically, the BCPU 60 not only generates a vertical synchronization signal (VD) with a specific period to determine the exposure period of the imaging device unit 54 but also transmits a synchronization signal BL_SYNC to the lens unit 12 independently of the vertical synchronization signal (VD).

The first transmission section 60-2 generates a synchronization signal BL_SYNC which has the same period as the vertical synchronization signal (VD) of the imaging device unit 54 and which has shifted in phase from the vertical synchronization signal. Specifically, the first transmission section 60-2 changes the phase shift according to the photographic condition of the imaging device unit 54, such as the exposure period of the imaging device unit 54. The first transmission section 60-2 sets the synchronization signal BL_SYNC at the time corresponding to the midpoint of exposure period of the imaging device unit 54.

The first transmission section 60-2 may set the synchronization signal BL_SYNC at the time corresponding to the start of the exposure period of the imaging device unit 54.

The first transmission section 60-2 may set the synchronization signal BL_SYNC at the time corresponding to the end of exposure period of the imaging device unit 54.

The LCPU 30 has the function of a lens control section 30-4, that of a position detection section 30-2, and that of a second transmission section 30-3 as shown in FIG. 4. The lens control section 30-4 provides driving control of the lens driving circuit 25 to move the photographic lens 21 along the optical axis P according to the instruction generated by the control section 60-1 of the body unit 11. The position detection section 30-2 detects the position of the photographic lens 21 on the optical axis P according to the synchronization signal BL_SYNC sent from the BCPU 60. The second transmission section 30-3 transmits to the BCPU 60 the position data on the photographic lens 21 detected by the position detection section 30-2.

The position detection section 30-2 detects items of position data on the photographic lens 21 sequentially according to the synchronization signal BL_SYNC. The items of position data on the photographic lens 21 are stored sequentially in the buffer memory 30-1. If the storage area of the buffer memory 30-1 has run short, the oldest data is overwritten with the latest data.

Having received a specific one of the instructions generated by the control section 60-1 sent from the first transmission section 60-2 of the body unit 11, the second transmission section 30-3 transmits to the body unit 11 a plurality of items of position data on the photographic lens 21 stored in the buffer memory 30-1.

Next, the operation of the imaging apparatus configured as described above will be explained.

The image processing controller 62 controls the imaging device interface circuit 61 under the control of the BCPU 60, thereby taking in image data from the imaging device unit 54. The taken-in image data is taken in by the SDRAM 63 functioning as a temporary storage memory. The image data taken in by the SDRAM 63 is subjected to various image processes and then converted into JPEG data, which is then stored in the storage medium 65.

As shown in FIGS. 2A and 2B, the mirror driving mechanism 50 drives the quick-return mirror 41 to the UP position or the DOWN position. As shown in FIG. 2A, when the quick-return mirror 41 is in the UP position, the optical finder is being used. As shown in FIG. 2B, when the quick-return mirror 41 is in the DOWN position, the live view is being used.

When the optical finder is being used, the mirror driving mechanism 50 puts the quick-return mirror 41 in the DOWN position. At this time, the incoming beam of light from the photographic lens 21 is split by the quick-return mirror 41 and sub-mirror 47 into a sub-beam directed to the pentaprism 43 and a sub-beam directed to the AF sensor unit 48.

The output of the AF sensor in the AF sensor unit 48 is transmitted to the BCPU 60 via the AF sensor driving circuit 49 and is subjected to a known focus detection process.

The photographer can view the subject through the eyepiece 44 adjacent to the pentaprism 43. A part of the beam of light passed through the pentaprism 43 is directed to the photometric sensor 70. The photometric circuit 69 performs a known photometric process on the basis of the amount of light detected by the photometric sensor 70.

Having received a signal for providing driving control of the shutter from the BCPU 60, the shutter control circuit 56 controls the shutter 52 on the basis of the signal. At the same time, the shutter control circuit 56 outputs a flash synchronization signal for causing the flash 72 to emit light with specific timing to the BCPU 60. On the basis of the flash synchronization signal, the BCPU 60 outputs a light emission instruction signal to the flash 72.

When the photographer has operated the mode change switch among the camera operation switches 78 and changed from the photographic mode to the image display mode, the image data stored in the storage medium 65 is read out and can be displayed on the liquid-crystal monitor 66. The image data read from the storage medium 65 is converted by the image processing controller 62 into a video signal, which is then displayed on the liquid-crystal monitor 66.

In contrast, when the live view is used, the quick-return mirror 41 is moved to the UP position by the mirror driving mechanism 50 as shown in FIG. 2B. This prevents the beam of light from being directed to the focusing screen 42. At the same time, the sub-mirror 47 is folded back and moved to the UP position as is the quick-return mirror 41. This prevents the beam of light from being directed to the AF sensor unit 48.

When the quick-return mirror 41 and sub-mirror 47 have moved to the UP position, the beam of light is directed to the imaging device unit 54 via the shutter 52. Under the control of the BCPU 60, the image processing controller 62 controls the imaging device interface circuit 61, thereby taking in the image data from the imaging device unit 54. The image data is converted into a video signal by the image processing controller 62 and the converted signal is displayed on the liquid-crystal monitor 66. The photographer can check the photographed image on the basis of the displayed image on the liquid-crystal monitor 66, that is, checks a so-called live view image.

Next, the photographic sequence of the imaging apparatus configured as described above will be explained with reference to a photography flowchart shown in FIG. 5. The photographic sequence is controlled mainly by the BCPU 60.

First, in step S101, the BCPU 60 determines whether the photographer has half-pressed the release switch among the camera operation switches 78, that is, whether the photographer has closed the first release switch (1RSW).

If the release switch has been half-pressed, the BCPU 60 proceeds to step S102 and performs imager AF.

Figure 6:
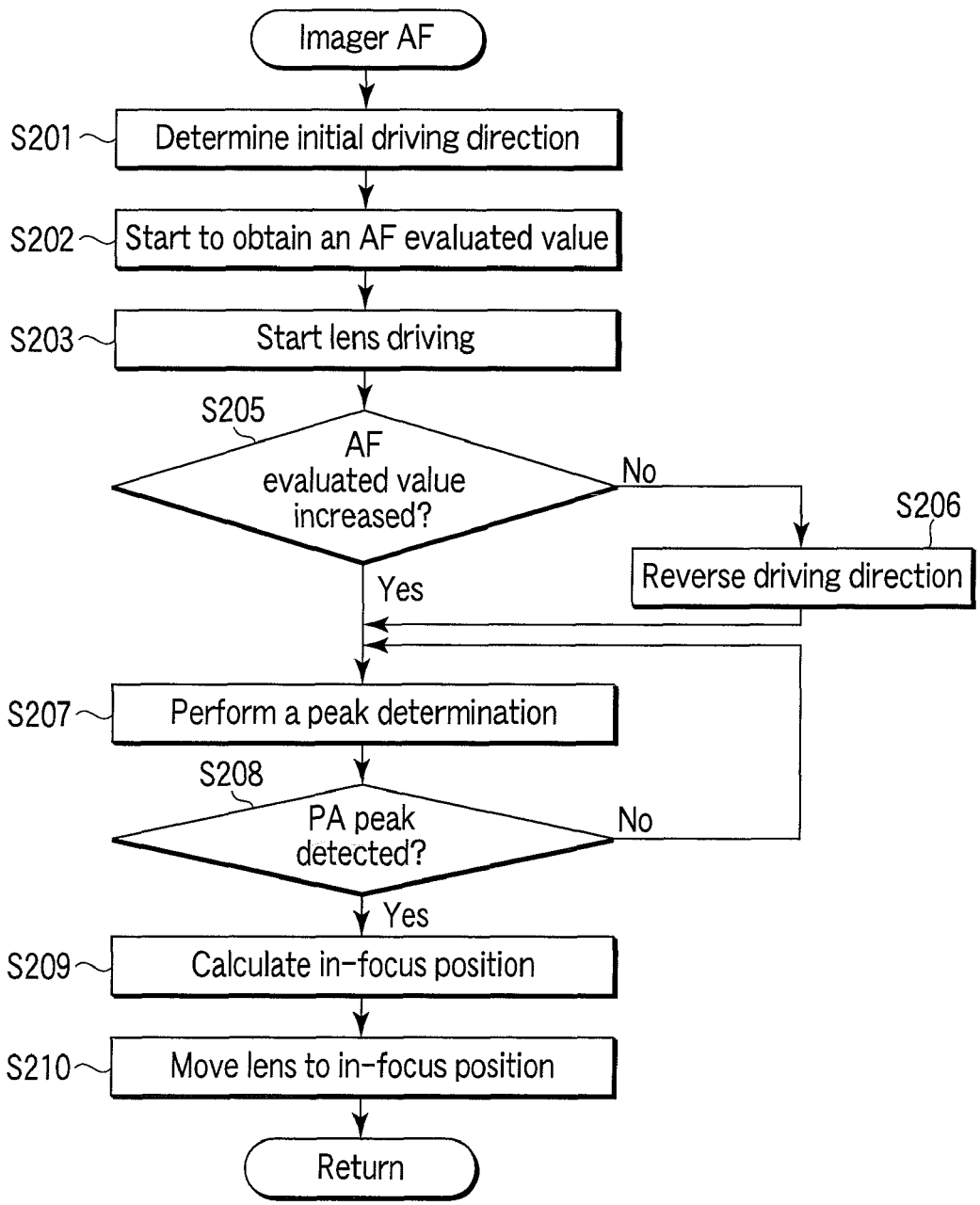
FIG. 6 is an operation flowchart for an imager AF of the imaging apparatus.

FIG. 6 is an operation flowchart for imager AF. In step S201, the BCPU 60 determines the initial driving direction of the photographic lens 21. In the process, the BCPU 60 determines whether to move the photographic lens 21 in the direction of either infinity "∞" or close proximity. For example, when the present position of the photographic lens 21 is closer to the infinity "∞" side, the photographic lens 21 is moved in the direction of close proximity.

Next, the BCPU 60 starts to acquire an AF evaluated value in step S202 and drives the lens driving circuit 25 and lens driving mechanism 24 in step S203, thereby starting to move the photographic lens 21. Lens driving control of the photographic lens 21 is performed on the basis of a control command transmitted from the BCPU 60 to the LCPU 30 via the communication connector 35.

Next, in step S205, the BCPU 60 determines whether the AF evaluated value (contrast value) has increased. If the result of the determination has shown that the AF evaluated value has decreased, the BCPU 60 proceeds to step S206 and reverses the moving direction of the photographic lens 21. Then, the BCPU 60 goes to step S207 and makes a peak determination.

Figure 7:
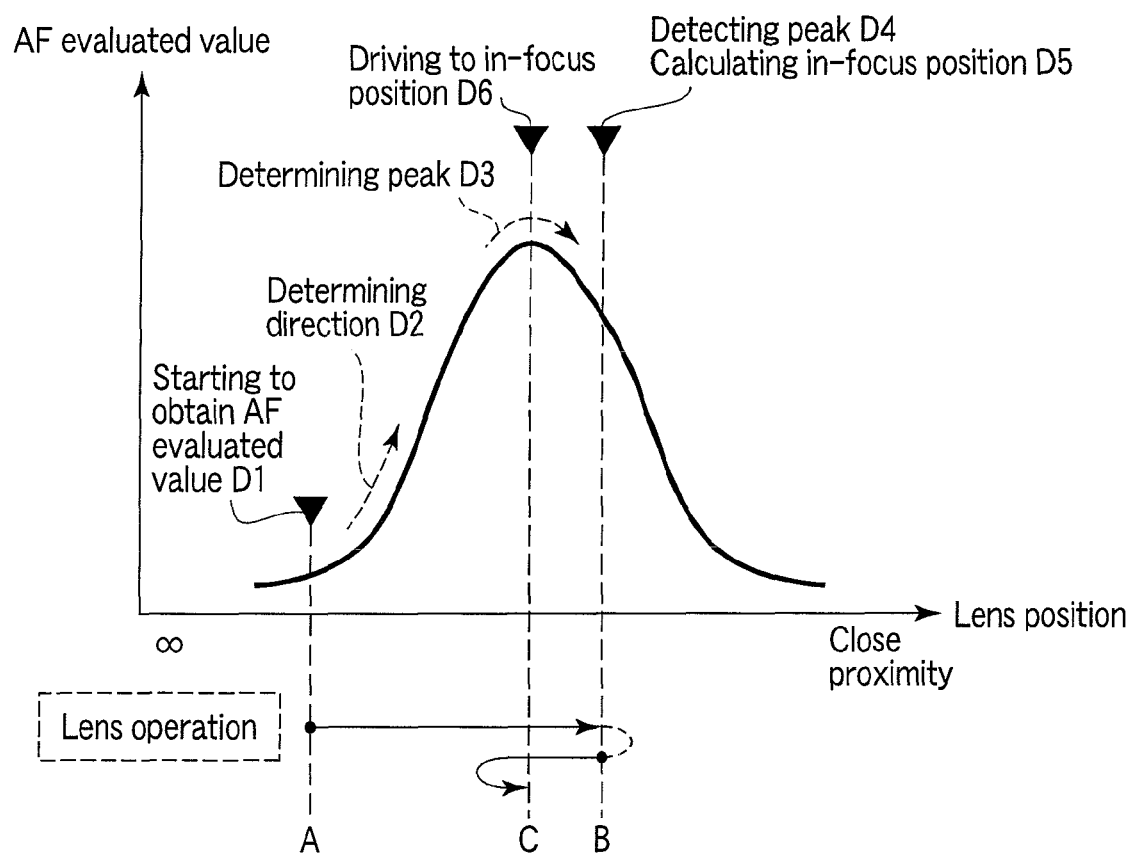
FIG. 7 is a diagram showing the relationship between the AF evaluated value of the photographic lens and the lens position of the photographic lens in the imaging apparatus.

FIG. 7 shows the relationship between the AF evaluated value of and the lens position of the photographic lens 21. The AF evaluated value, which is synonymous with the contrast value, is data obtained by quantifying the degree of blurring of an image. Generally, HPF and BPF are applied to image data and a value obtained by accumulating the results is used as the AF evaluated value.

As shown in FIG. 7, the photographic lens 21 starts to move from the infinity "∞" side. When an AF evaluated value starts to be obtained (D1 in FIG. 7), the driving direction of the photographic lens 21 is determined (D2 in FIG. 7), depending on the increase or decrease of the AF evaluated value. In the example of FIG. 7, the photographic lens 21 has been moved from the infinity "∞" side toward the close proximity side. Conversely, when the photographic lens 21 has been driven from D1 toward the infinity "∞" side, it is determined in step S205 that the AF evaluated value has decreased and therefore the moving direction of the photographic lens 21 is reversed. That is, the moving direction of the photographic lens 21 is reversed so as to move from the infinity "∞" side toward the close proximity side.

Next, the BCPU 60 makes a peak determination (D3 in FIG. 7) in step S207 and determines in step S208 whether it has detected a peak. If having detected no peak, the BCPU 60 goes to step S207 and repeats the above processing operation until it has detected a peak.

If having detected a peak (D4 in FIG. 7), the BCPU 60 goes to step S209 and calculates an in-focus position (D5 in FIG. 7). Next, in step S210, the BCPU 60 moves the photographic lens 21 to the in-focus position calculated in step S209 (D6 in FIG. 7).

Although the BCPU 60 moves the photographic lens 21 to the in-focus position in step S210, it actually operates as follows. As shown in the lower part of FIG. 7, the photographic lens 21 moves from point A where the acquisition of an AF evaluated value is started (D1) toward the close proximity side. When a peak has been detected (D4), an in-focus position is calculated (D5).

At the same time, the lens moving direction of the photographic lens 21 is reversed and the lens moves from point. B toward the infinity "∞" side. After the photographic lens 21 has passed the peak position once, the lens moving direction is reversed again and the photographic lens 21 moves toward point C, an in-focus position. This is done to eliminate the effect of a backlash in the lens driving mechanism 24 and the like and stop the lens optically at the same position accurately when the lens passes the peak of the AF evaluated value. By doing this, the photographic lens 21 reaches point C, the in-focus position.

The BCPU 60 determines the reliability of the in-focus position calculated on the basis of a change in the AF evaluated value obtained in step S210. If the reliability is low, the BCPU 60 determines that the position is not the in-focus position and does not execute step S210. If the in-focus position has been reached, the BCPU 60 sets an in-focus flag to "1." If the in-focus position has not been reached, the BCPU 60 set the in-focus flag to "0."

Next, in the photography flowchart of FIG. 5, the BCPU 60 determines the state of the in-focus flag in step S103. If the in-focus flag is set or in the in-focus state, the BCPU 60 goes to step S104 and determines again whether the release switch among the camera operation switches 78 has been half-pressed, or whether the first release switch (1RSW) has been opened. If the in-focus flag is cleared or in the out-of-focus state in step S103, the BCPU 60 goes to step S107 and performs an out-of-focus process.

If the photographer has completed the half-press operation without fully pressing the release switch, the BCPU 60 goes to step S101 and waits for the first release switch (1RSW) to be pressed.

If having determined that the release switch is kept half-pressed, the BCPU 60 determines in step S105 whether the release switch has been fully pressed or whether the second release switch (2RSW) has been operated. The BCPU 60 waits for the release switch to be fully pressed. If the release switch has been fully pressed, the BCPU 60 goes to step S106 and performs an exposure operation.

FIG. 9 shows the relationship between the lens position and the AF evaluated value in performing imager AF, the lens position obtaining timing, and the timing related to lens communication.

If having determined that the power switch has been closed, the BCPU 60 causes the imaging device interface circuit 61 to generate a vertical synchronization signal (VD) with a specific period to perform a photographic operation.

When performing an imager AF operation, the control section 60-1 of the BCPU 60 generates an instruction to move the photographic lens 21 along the optical axis P in the lens unit 12. At the same time, the control section 60-1 generates a synchronization signal BL_SYNC according to the photographic timing of the imaging device unit 54. The BCPU 60 generates a command to acquire position data on the photographic lens 21.

The synchronization signal BL_SYNC, which is independent of the vertical synchronization signal (VD), has the same period as and has shifted in phase from the vertical synchronization signal (VD). The phase shift in the synchronization signal BL_SYNC varies according to the photographic condition of the imaging device unit 54, for example, the exposure period of the imaging device unit 54. The synchronization signal BL_SYNC is set to the time corresponding to the midpoint of the exposure period of the imaging device unit 54. The first transmission section 60-2 transmits to the lens unit 12 the instruction to move the photographic lens 21 along the optical axis P and synchronization signal BL_SYNC.

Figure 8:
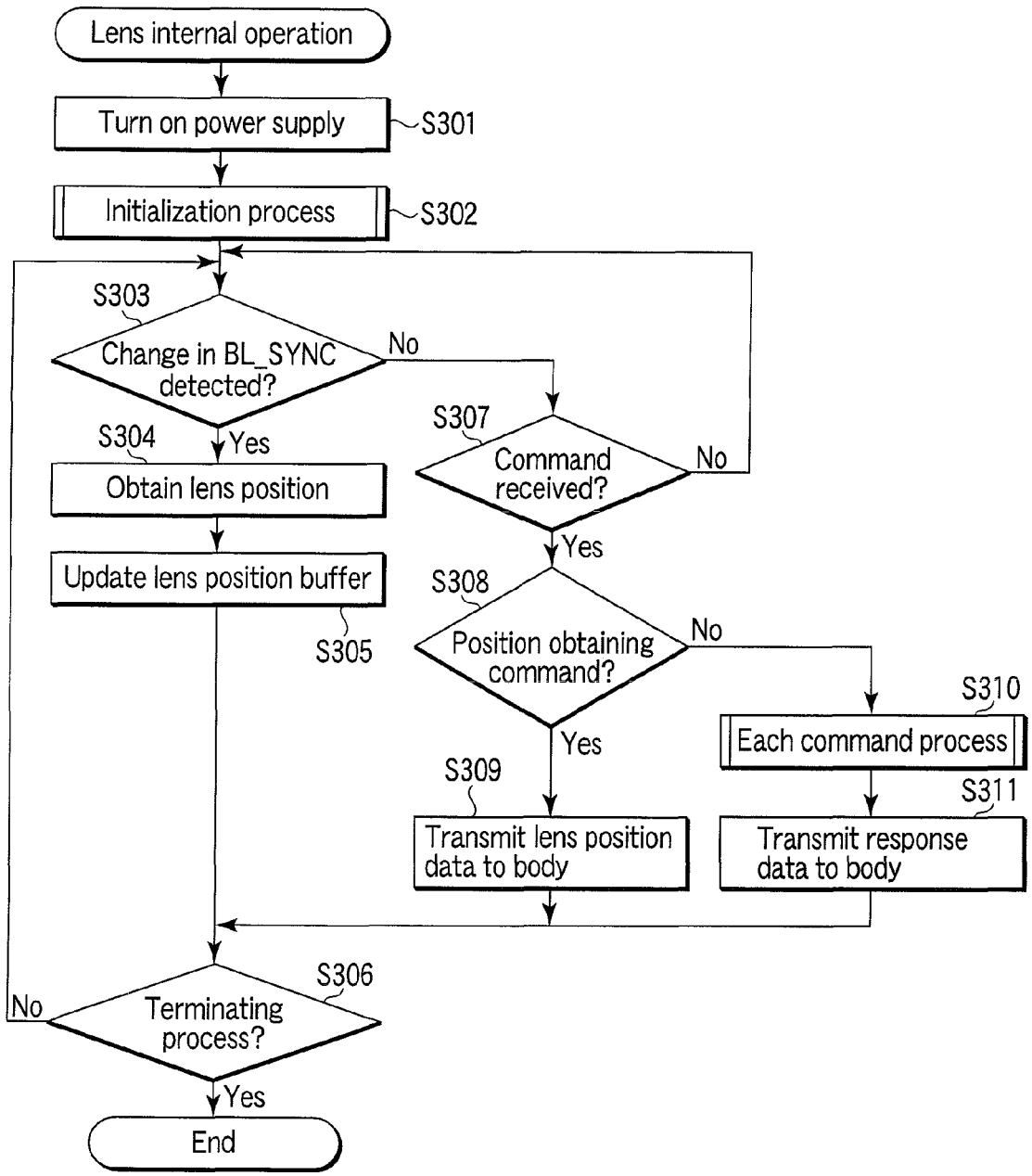
FIG. 8 is a lens internal operation flowchart for the operation of acquiring position data on the photographic lens in the lens unit of the imaging apparatus.

Next, the operation of acquiring position data on the photographic lens 21 in the lens unit 12 will be explained with reference to a lens internal operation flowchart shown in FIG. 8.

After the BCPU 60 has determined in step S301 that the power switch has been closed, if the LCPU 30 has received a command to carry out an initialization process, the LPCU 30 performs an initialization process in step S302.

Next, the LCPU 30 determines in step S303 whether the synchronization signal BL_SYNC sent from the BCPU 60 of the body unit 11 has gone high. If the result of the determination has shown that the synchronization signal BL_SYNC has gone high, the LCPU 30 causes the position detection section 30-2 to detect position data on the photographic lens 21 on the optical axis P in step S304.

As shown in FIG. 9, when the synchronization signal BL_SYNC goes high, the LCPU 30 causes the position detection section 30-2 to detect position data a10 on the photographic lens 21 on the optical axis P. The timing of detecting position data a10 on the photographic lens 21 on the optical axis P, that is, the timing with which the synchronization signal BL_SYNC goes high, is the time corresponding to the midpoint of the exposure period of the imaging device unit 54.

Next, the LCPU 30 updates the data in the buffer memory 30-1 in step 305, that is, stores position data a10 on the photographic lens 21 on the optical axis P in the buffer memory 30-1.

Next, the LCPU 30 determines in step S306 whether the operation of acquiring position data on the photographic lens 21 has been completed. If the result of the determination has shown that the operation of acquiring position data on the photographic lens 21 has not been completed, the LCPU 30 returns to step S303.

If the result of the determination of whether the synchronization signal BL_SYNC has gone high in step S303 has shown that the synchronization signal BL_SYNC has not gone high, the LCPU 30 goes to step S307 and determines whether it has received a command from the BCPU 60.

If the result of the determination has shown that the LCPU 30 has received a command from the BCPU 60, the LCPU 30 determines in step S308 whether the command is for acquiring position data on the photographic lens 21.

If the command is for acquiring position data on the photographic lens 21, the LCPU 30 proceeds to step S309 and causes the second transmission section 30-3 to transmit position data a10 on the photographic lens 21 stored in the buffer memory 30-1 to the body unit 11.

If the result of the determination in step S308 has shown that the command is not for acquiring position data on the photographic lens 21, the LCPU 30 returns to step S310 and executes a process according to the received command. Next, in step S311, the LCPU 30 transmits to the body unit 11 the data processed according to the command, that is, the data in response to the command.

Then, the LCPU 30 determines again in step S303 whether the synchronization signal BL_SYNC sent from the BCPU 60 of the body unit 11 has gone high. If the result of the determination has shown that the synchronization signal BL_SYNC has gone high, the LCPU 30, in step S304, causes the position detection section 30-2 to detect position data a11 on the photographic lens 21 on the optical axis P at the time corresponding to the midpoint of the exposure period of the imaging device unit 54.

Next, in step S305, the LCPU 30 updates the data in the buffer memory 30-1, that is, stores position data a11 on the photographic lens 21 on the optical axis P in the buffer memory 30-1. As a result, the buffer memory 30-1 stores position data a10 and position data a11 on the photographic lens 21 on the optical axis P.

Similarly, when having received a command to acquire position data on the photographic lens 21, the LCPU 30 proceeds to step S309 and causes the second transmission section 30-3 to transmits position data a11 on the photographic lens 21 stored in the buffer memory 30-1 to the body unit 11.

From this point on, when having sensed that the synchronization signal BL_SYNC has gone high, the LCPU 30 causes the position detection section 30-2 to detect items of position data a12, a13, a14 on the photographic lens 21 on the optical axis P and stores these items of position data a12, a13, a14 on the photographic lens 21 on the optical axis P in the buffer memory 30-1. Consequently, the items of position data a10, a11, a12, a13, a14 on the photographic lens 21 on the optical axis P are stored in the buffer memory 30-1 sequentially. Having received commands to acquire position data on the photographic lens 21 sequentially, the LCPU 30 transmits the items of position data a12, a13, a14 on the photographic lens 21 stored in the buffer memory 30-1 to the body unit 11 sequentially.

The BCPU 60 of the body unit 11 receives the items of position data a10, a11, a12, a13, a14 on the photographic lens 21 from the lens unit 12 sequentially. The BCPU 60 determines a position where the AF evaluated value is the largest to be the in-focus position on the basis of the items of position data a10 to a14 on the photographic lens 21 and the AF evaluated values corresponding to the items of position data a10 to a14, respectively.

The items of position data a10 to a14 on the photographic lens 21 may be transmitted to the body unit 11 not only each time each of the items of position data a10 to a14 is acquired, but also in such a manner that all of the items of position data a10 to a14 stored in the buffer memory 30-1 are transmitted at the same time as shown, for example, in the lower part of FIG. 9 after the operation of acquiring position data on the photographic lens 21 has been completed.

If there are at least three AF evaluated values, the position where the largest AF evaluated value is may be set as the in-focus position. Accordingly, if the AF evaluated value changes as shown in FIG. 9, for example, if there are three items of position data a11, a12, a13 on the photographic lens 21, the position where the largest AF evaluated value is may be determined to be the in-focus position. Therefore, the LCPU 30 may transmit the three items of position data a11, a12, a13 stored in the buffer memory 30-1 at the same time after the operation of acquiring position data on the photographic lens 21 has been completed.

In FIG. 9, the communication times of the items of position data a10, a11, a12, a13, a14 on the photographic lens 21 from the lens unit 12 to the body unit 11 differ due to such an effect as a variation in the communication time between the lens unit 12 and the body unit 11. However, each of the items of position data a10, a11, a12, a13, a14 is data at the time when the synchronization signal BL_SYNC goes high and therefore is unaffected by a variation in the communication time.

FIG. 10 shows the timing of acquiring position data on the focusing lens in a shorter exposure period. In such a shorter exposure period, the luminance of the subject is higher than in the exposure period of FIG. 9. As in the normal exposure period, in the shorter exposure period, the LCPU 30 causes the position detection section 30-2 to detect position data b10 on the photographic lens 21 on the optical axis P when the synchronization signal BL_SYNC goes high. The timing of detecting position data b10 on the photographic lens 21 on the optical axis P, that is, the timing with which the synchronization signal BL_SYNC goes high, is the time corresponding to the midpoint of the exposure period of the imaging device unit 54.

Next, the LCPU 30 updates the data in the buffer memory 30-1, that is, stores position data b10 on the photographic lens 21 on the optical axis P in the buffer memory 30-1.

From this point on, when the synchronization signal BL_SYNC has gone high, the LCPU 30 causes the position detection section 30-2 to detect items of position data b11, b12, b13, b14 on the photographic lens 21 on the optical axis P and stores these items of position data in the buffer memory 30-1. Consequently, the items of position data b10, b11, b12, b13, b14 on the photographic lens 21 on the optical axis P are stored in the buffer memory 30-1 sequentially. Having received commands to acquire position data on the photographic lens 21 sequentially, the LCPU 30 transmits the items of position data b10, b11, b12, b13, b14 on the photographic lens 21 stored in the buffer memory 30-1 to the body unit 11 sequentially.

As described above, with the first embodiment, when the synchronization signal BL_SYNC has gone high, the position of the photographic lens 21 on the optical axis P is detected. For example, in the case of normal exposure time, the detected position data on the photographic lens 21, such as items of position data a11, a12, a13, a14 on the photographic lens 21, is stored in the buffer memory 30-1. The items of position data a11, a12, a13, a14 on the photographic lens 21 stored in the buffer memory 30-1 are transmitted to the BCPU 60.

This prevents the actual position of the photographic lens 21 according to the exposure timing from being mismatched with position data on the photographic lens 21 transmitted from the lens unit 12 to the body unit 11. The items of position data a10, a11, a12, a13, a14 on the photographic lens 21 at the time when the synchronization signal BL_SYNC goes high, that is, at the midpoint of the exposure period, can be detected. These items of position data a10, a11, a12, a13, a14 can be transmitted to the BCPU 60. Accordingly, when the contrast AF is performed during a continuous movement of the photographic lens 21, position data on the photographic lens 21 in acquiring a contrast value can be acquired accurately, which improves the AF accuracy.

The items of position data a10, a11, a12, a13, a14 on the photographic lens 21 detected at the time when the synchronization signal BL_SYNC has gone high are stored in the buffer memory 30-1 temporarily and then transmitted to the BCPU 60. This makes it possible to use the position data in various ways, such as acquiring position data on the photographic lens each time or transmitting only necessary data simultaneously and acquiring position data. Acquiring only the necessary data by limiting data items to those before and after the peak of the AF evaluated value contributes to a reduction in the communication time and further to a reduction in the load on the LCPU and BCPU.

Next, a second embodiment of the invention will be explained with reference to the accompanying drawings. The configuration of the imaging apparatus is almost the same as that of FIG. 1. What differs from FIG. 1 will be explained with reference to FIG. 1.

The imaging device unit 54 is controlled by the image processing controller 62 via the imaging device interface circuit 61 under the control of the BCPU 60. With this control, the image processing controller 62 takes in image data from the imaging device unit 54.

The imaging device unit 54 has a so-called rolling shutter function of photographing while shifting the exposure period at intervals of a specific number of lines as in a MOS sensor, such as a CMOS sensor.

FIG. 11A is a schematic diagram to help explain the operation of the rolling shutter of the imaging device unit 54. The imaging device unit 54 is composed of n rows of imaging device lines. When the exposure of a first imaging device line has been started and then this exposure period has expired, a read period of the first imaging device line is started and then the data is read from the imaging device line.

After a preset delay time has elapsed since the exposure of the first imaging device line was started, the exposure of a second imaging device line is started. When this exposure period has expired, a read period of the second imaging device line is started and then the data is read from the imaging device line.

After a preset delay time has elapsed since the exposure of the second imaging device line was started, the exposure of a third imaging device line is started. When this exposure period has expired, a read period of the third imaging device line is started and then the data is read from the imaging device line.

Similarly, the exposure of the last n-th imaging device line is started. When this exposure period has expired, a read period of the n-th imaging device line is started and then the data is read from the imaging device line.

As described above, the imaging device unit 54 takes a picture with the rolling shutter. For example, the imaging device unit 54 photographs an object Q as a subject moving in the direction shown by arrow F as shown in FIG. 11B. Image data D acquired by the photography forms an image D of the object Q inclined according to the delay time in the start of the exposure of each of the imaging device lines as shown in FIG. 11c.

As shown in FIG. 12, the BCPU 60 includes a control section 60-1, a first transmission section 60-2, and a main subject position setting section 60-3. The control section 60-1 generates an instruction to move the photographic lens 21 of the lens unit 12 along the optical axis P. The first transmission section 60-2 transmits to the lens unit 12 the instruction generated by the control section 60-1 and a synchronization signal BL_SYNC according to the specific exposure timing of the imaging device unit 54. The main subject position setting section 60-3 acquires data on the subject on the basis of the imaging output of the imaging device unit 54, detects a main subject automatically, and sets the position of the main subject in the photographic screen.

The control section 60-1 performs focusing by controlling the movement of the photographic lens 21 along the optical axis P on the basis of position data on the photographic lens 21.

The main subject position setting section 60-3 detects the position of a face area (the area of the main subject) T in the photographic area on the basis of the imaging output of the imaging device unit 54. For example, the main subject position setting section 60-3 senses where the face area (main subject area) T is in the photographic area E as shown in FIGS. 13A and 13B and outputs data indicating the position where the main subject area T is.

On the basis of the imaging output, the main subject position setting section 60-3 detects, for example, color data on the subject, the motion vector, and the main subject area T, such as the position of the face through face recognition.

The first transmission section 60-2 sets the timing with which, for example, the synchronization signal BL_SYNC goes high on the basis of the position of the main subject acquired by the main subject position setting section 60-3. For example, the first transmission section 60-2 sets the timing of exposing the line part corresponding to the position of the main subject area T detected by the main subject position setting section 60-3 to the timing with which the synchronization signal BL_SYNC goes high.

FIGS. 13A and 13B show examples of setting an AF area by detecting the main subject. In FIGS. 13A and 13B, the face area (main subject area) T detected by face recognition is set as an AF area. Even in the upper part of the photographic screen E as shown in FIG. 14A or in the lower part of the screen E as shown in FIG. 14B, the face is detected automatically and an AF area is adjusted to the position and size of the main subject area T.

FIG. 15 shows an example of the timing of outputting the synchronization signal BL_SYNC in the cases of FIGS. 13A and 13B. The exposure period and read period in the rolling shutter operation of the imaging device unit 54 are represented by a parallelogram obtained by simplifying FIG. 11A.

When the main subject area T is in the upper part of the screen as shown in FIG. 13A, the rise timing of a pulse of synchronization signal BL_SYNC is seted according to the midpoint of the exposure period of, for example, the upper end line as shown by synchronization signal BL_SYNC "1" of FIG. 15.

When the main subject area T is in the lower part of the screen as shown in FIG. 13B, the rise timing of a pulse of synchronization signal BL_SYNC is seted according to the midpoint of the exposure period of, for example, the lower end line as shown by synchronization signal BL_SYNC "2" of FIG. 15.

The rise timing of a pulse of synchronization signal BL_SYNC is determined as follows. If the main subject area T has been detected, its center position is specified as a representative of the position of the main subject area T. Then, it is sensed to what number one of the imaging device lines of the imaging device unit 54 the center position of the main subject area T corresponds. The midpoint of the exposure period of the sensed line is set as the rise timing of a pulse of synchronization signal BL_SYNC.

The upper end line and lower end line of FIG. 15 indicate the lines located inward from the upper end and lower end of the photographic screen E by a specific distance, respectively. Accordingly, suppose the main subject area T shown in each of FIGS. 13A and 13B agrees with the upper end line and lower end line, respectively.

Next, a lens internal operation in the second embodiment will be explained with reference to the diagram of the timing of acquiring position data on the focusing lens when the rolling shutter shown in FIG. 15 is used and to the lens internal operation flowchart shown in FIG. 8.

When having determined that the power switch has been closed, the control section 60-1 of the BCPU 60 generates an instruction to move the photographic lens 21 of the lens unit 12 along the optical axis P. At the same time, the control section 60-1 generates a vertical synchronization signal (VD) with a specific period and further generates a synchronization signal BL_SYNC according to the photographic timing of the imaging device unit 54. The BCPU 60 generates a command to acquire position data on the photographic lens 21.

The synchronization signal BL_SYNC is set so as to go high at the midpoint of the exposure period of the upper end one of the imaging device lines of the imaging device unit 54 corresponding to, for example, the position where the main subject area T is as shown in FIG. 13A. Synchronization signal BL_SYNC "1" is independent of the vertical synchronization signal (VD). Synchronization signal BL_SYNC "1" is identity cycle to the vertical synchronization signal (VD) and shift in phase relative to the vertical synchronization signal (VD).

Synchronization signal BL_SYNC "1", whose phase shift changes according to the photographic condition for the imaging device unit 54, such as the exposure period of the imaging device unit 54, is set so as to go high at the midpoint of the exposure period of the upper end one of the imaging device lines.

The first transmission section 60-2 transmits each of the instruction to move the photographic lens 21 along the optical axis P, and synchronization signal BL_SYNC "1" to the lens unit 12.

If having determined in step S301 that the power switch has been closed, the LCPU 30 performs an initialization process in step S302.

Next, in step S303, the LCPU 30 determines whether synchronization signal BL_SYNC "1" sent from the BCPU 60 of the body unit 11 has gone high. If the result of the determination has shown that synchronization signal BL_SYNC "1" has gone high, the position detection section 30-2 of the LCPU 30, in step S304, detects position data c10 on the photographic lens 21 on the optical axis P at the midpoint of the exposure period of the upper end one of the imaging device lines as shown in FIG. 15 when synchronization signal BL_SYNC "1" has gone high.

Next, in step S305, the LCPU 30 updates the data in the buffer memory 30-1, that is, stores position data c10 on the photographic lens 21 on the optical axis P in the buffer memory 30-1.

If the result of the determination of whether synchronization signal BL_SYNC "1" has gone high in step S303 has shown that synchronization signal BL_SYNC "1" has not gone high, the LCPU 30 goes to step S307 and determines whether it has received a command from the BCPU 60.

If the result of the determination has shown that the LCPU 30 has received a command from the BCPU 60, the LCPU 30 determines in step S308 whether the command is to acquire position data on the photographic lens 21. If the command is to acquire position data on the photographic lens 21, the BCPU 60 goes to step S309 and causes the second transmission section 30-3 to transmit position data c10 on the photographic lens 21 stored in the buffer memory 30-1 to the body unit 11.

The LCPU 30 determines again in step 303 whether synchronization signal BL_SYNC "1" sent from the BCPU 60 of the body unit 11 has gone high. If the result of the determination has shown that synchronization signal BL_SYNC "1" has gone high, the LCPU 30, in step 304, causes the position detection section 30-2 to detect position data c11 on the photographic lens 21 on the optical axis P when synchronization signal BL_SYNC "1" has gone high, that is, at the midpoint of the exposure period of the upper end one of the imaging device lines.

Next, in step S305, the LCPU 30 updates the data in the buffer memory 30-1, that is, stores position data c11 on the photographic lens 21 on the optical axis P in the buffer memory 30-1. In the buffer memory 30-1, items of position data c10, c11 on the photographic lens 21 on the optical axis P are stored.

Similarly, if having received a command to acquire position data on the photographic lens 21, the BCPU 60 goes to step S309 and causes the second transmission section 30-3 to transmit position data c11 on the photographic lens 21 stored in the buffer memory 30-1 to the body unit 11.

From this point on, the LCPU 30 causes the position detection section 30-2 to detect items of position data c12, c13, c14 on the photographic lens 21 on the optical axis P when synchronization signal BL_SYNC "1" has gone high and store the items of position data c12, c13, c14 on the photographic lens 21 on the optical axis P in the buffer memory 30-1. Having received commands to acquire position data on the photographic lens 21 sequentially, the LCPU 30 transmits the items of position data c12, c13, c14 on the photographic lens 21 stored in the buffer memory 30-1 to the body unit 11 sequentially.

The BCPU 60 of the body unit 11 receives the items of position data c10, c11, c12, c13, c14 on the photographic lens 21 from the lens unit 12 sequentially. The BCPU 60 determines a position where the AF evaluated value is the largest to be the in-focus position on the basis of the items of position data c10 to c14 on the photographic lens 21 and the AF evaluated values corresponding to the items of position data c10 to c14, respectively.

The items of position data c10 to c14 on the photographic lens 21 may be transmitted simultaneously to the body unit 11 after the operation of acquiring the items of position data c10 to c14 has been completed.

If having been set so as to correspond to the position where the main subject area T is as shown in FIG. 13B, synchronization signal BL_SYNC "2" is set so as to go high at the midpoint of the exposure period of, for example, the lower end one of the imaging device lines of the imaging device unit 54 as shown in FIG. 15.

The LCPU 30 determines in step 303 whether synchronization signal BL_SYNC "2" sent from the BCPU 60 of the body unit 11 has gone high. If the result of the determination has shown that synchronization signal BL_SYNC "2" has gone high, the LCPU 30, in step 304, causes the position detection section 30-2 to detect position data d10 on the photographic lens 21 on the optical axis P at the midpoint of the exposure period of the lower end one of the imaging device lines when synchronization signal BL_SYNC "2" has gone high.

Next, in step S305, the LCPU 30 updates the data in the buffer memory 30-1, that is, stores position data d10 on the photographic lens 21 on the optical axis P in the buffer memory 30-1.

Next, the LCPU 30 receives a command from the BCPU 60. If the command is to acquire position data on the photographic lens 21, the LCPU 30 goes to step S309 and causes the second transmission section 30-3 to transmit position data d10 on the photographic lens 21 stored in the buffer memory 30-1 to the body unit 11.

From this point on, the LCPU 30 causes the position detection section 30-2 to detect items of position data d11, d12, d13, d14 on the photographic lens 21 on the optical axis P when synchronization signal BL_SYNC "2" has gone high. The LCPU 30 stores the items of position data d11, d12, d13, d14 on the photographic lens 21 on the optical axis P in the buffer memory 30-1. Having received commands to acquire position data on the photographic lens 21 sequentially, the LCPU 30 transmits the items of position data d11, d12, d13, d14 on the photographic lens 21 stored in the buffer memory 30-1 to the body unit 11 sequentially.

The BCPU 60 of the body unit 11 receives the items of position data d10, d11, d12, d13, d14 on the photographic lens 21 from the lens unit 12 sequentially. The BCPU 60 determines a position where the AF evaluated value is the largest to be the in-focus position on the basis of the items of position data d10 to d14 on the photographic lens 21 and the AF evaluated values corresponding to the items of position data d10 to d14, respectively.

In the second embodiment, the timing of acquiring position data on the photographic lens 21 at the midpoint of the exposure period of each of the upper end one and lower end one of the imaging device lines corresponding to the position where the main subject area T is has been explained. The invention is not limited to this. For instance, position data on the photographic lens 21 may be acquired similarly by using the central one or a different one of the imaging device lines corresponding to the position where the main subject area T is.

As described above, with the second embodiment, even when the imaging device unit 54 with the rolling shutter function has been used, the position of the photographic lens 21 on the optical axis P is detected when synchronization signal BL_SYNC has gone, for example, high. Data on the position of the photographic lens 21 is stored in the buffer memory 30-1. The position data on the photographic lens 21 stored in the buffer memory 30-1 is transmitted to the BCPU 60. This produces the same effect as that of the first embodiment. That is, when contrast AF is performed in the middle of moving the photographic lens 21 continuously, position data on the photographic lens 21 in acquiring a contrast value can be acquired accurately, which improves the AF accuracy.

Next, a first modification of the second embodiment will be explained. Referring to FIGS. 16A and 16B, the first modification will be explained using an example of the operation of acquiring position data on the photographic lens 21 when the main subject area T moves in the photographic area E.

The main subject area T moves, for example, from the upper part to the middle part and to the lower part in the photographic area E as time passes. The movement of the main subject area T can be traced by, for example, recognizing the face or detecting the color or shape of the subject.

The main subject position setting section 60-3 of the BCPU 60 of FIG. 12 detects the position of the main subject area T in the photographic area E on the basis of the imaging output of the imaging device unit 54. For example, as shown in FIG. 16A, the main subject position setting section 60-3 senses that the main subject area T as the face area moves from the upper part to the middle part and to the lower part in the photographic area E as time advances and outputs subject data indicating the position where the main subject area T is.

The BCPU 60 follows the movement of the main subject area T in the photographic area E and, when main subject area T is in the upper part of the photographic area E, sets synchronization signal BL_SYNC "3" so as to go high at the midpoint of the exposure period of line L1 corresponding to the upper part of the imaging device lines of the imaging device unit 54 as shown in FIG. 16B, that is, to the upper part of the photographic screen.

The BCPU 60 sets synchronization signal BL_SYNC "3" so that the signal may follow the movement from the upper part to the middle part and to the lower part in the photographic area E and go high at the midpoint of the exposure period of each of lines L2, L3, ..., L5 of the imaging device lines of the imaging device unit 54.

As described above, with the first modification, even when the main subject area T moves in the photographic area E as time passes as shown in FIGS. 16A and 16B, the position where the face area (main subject area) T exists is detected and the timing of acquiring the position of the photographic lens 21 is caused to correspond to the detected position. This makes it possible to acquire position data on the photographic lens 21 accurately and therefore improve the AF accuracy.

Next, a second modification of the second embodiment will be explained. Referring to FIGS. 17A and 17B, the second modification will be explained using an example of the operation of acquiring position data on the photographic lens 21 when there are a plurality of main subject areas T in the photographic area E.

In the photographic area E, there are a plurality of main subject areas T, for example, three face areas (main subject areas) T1, T2, T3 as shown in FIG. 17A. For example, a main subject area T1 is in the upper part of the photographic area E. A main subject area T2 is in the middle part of the photographic area E. A main subject area T3 is in the lower part of the photographic area E.

The first transmission section 60-2 of the BCPU 60 of FIG. 12 sets the timing of acquiring position data to each of the rising edge and falling edge of the synchronization signal BL_SYNC on the basis of the position of the main subject obtained by the main subject position setting section 60-3.

The position detection section 30-2 of the LCPU 30 detects the position of the photographic lens 21 in synchronization with each of the rising edge and falling edge of the synchronization signal BL_SYNC from the BCPU 60.

When the positions of a plurality of main subject areas are close to one another vertically in the photographic screen E, it is difficult to specify the timing of acquiring all the items of position data by using only a change in the rising edge of the synchronization signal BL_SYNC as in the first and second embodiments. The reason is that there is a limit not only to shortening the pulse interval of synchronization signal BL_SYNC but also to the shortness of a pulse whose rising edge can be detected.

The main subject position setting section 60-3 of the BCPU 60 detects the positions of the main subject areas T1, T2, T3 in the photographic area E on the basis of the imaging output of the imaging device unit 54 and outputs data indicating the positions of the main subject areas T1, T2, T3.

As shown in FIG. 17B, the first transmission section 60-2 of the BCPU 60 sets the timing of acquiring position data to each of the rising edge and falling edge of the synchronization signal BL_SYNC on the basis of the main subject areas T1, T2, T3 obtained by the main subject position setting section 60-3. Specifically, the first transmission section 60-2 sets the timing of each of the rising edge and falling edge of the synchronization signal BL_SYNC to, for example, the midpoint of the exposure period of the upper line L10 in the imaging device lines of the imaging device unit 54 corresponding to main subject area T1, the midpoint of the exposure period of central line L11 in the imaging device lines corresponding to main subject area T2, and the midpoint of the exposure period of the lower line L12 in the imaging device lines corresponding to main subject area T3.

Next, the LCPU 30 determines whether the synchronization signal BL_SYNC sent from the BCPU 60 has gone high. The result of the determination has shown that the synchronization signal BL_SYNC has gone high, the LCPU 30 causes the position detection section 30-2 to detect position data on the photographic lens 21 on the optical axis P at the midpoint of the exposure period of line L10 in the imaging device lines when the synchronization signal BL_SYNC has gone high. Next, the LCPU 30 stores position data on the photographic lens 21 on the optical axis P in the buffer memory 30-1.

Next, when the synchronization signal BL_SYNC sent from the BCPU 60 has gone low, the LCPU 30 causes the position detection section 30-2 to detect position data on the photographic lens 21 on the optical axis P at the midpoint of the exposure period of line L11 in the imaging device lines when the synchronization signal BL_SYNC has gone low. Next, the LCPU 30 stores position data on the photographic lens 21 on the optical axis P in the buffer memory 30-1.

Next, when the synchronization signal BL_SYNC sent from the BCPU 60 has gone high, the LCPU 30 causes the position detection section 30-2 to detect position data on the photographic lens 21 on the optical axis P at the midpoint of the exposure period of line L12 in the imaging device lines when the synchronization signal BL_SYNC has gone high. Next, the LCPU 30 stores position data on the photographic lens 21 on the optical axis P in the buffer memory 30-1.

From this point on, the LCPU 30 causes the position detection section 30-2 to detect each item of position data on the photographic lens 21 on the optical axis P at the time when the synchronization signal BL_SYNC goes high or low and stores the items of position data in the buffer memory 30-1. Having received commands to acquire position data on the photographic lens 21 sequentially, the LCPU 30 transmits the items of position data on the photographic lens 21 stored in the buffer memory 30-1 to the body unit 11 sequentially.

FIG. 17C shows AF areas "1" to "11" of the photographic screen in performing multi AF. Generally, in multi AF, AF evaluated values are obtained in all of the AF areas and the optimum one of the AF areas is selected automatically.

The position or positions of one or more AF areas automatically selected by multi AF can be set in place of the positions of the main subject areas T. That is, the timing of acquiring position data may be set to each of the rising edge and falling edge of the synchronization signal BL_SYNC at the midpoint of the exposure period of one of the imaging device lines of the imaging device unit 54 corresponding to the selected AF area.

Even when there are a plurality of main subject areas T, for example, three main subject areas T1, T2, T3 in the photographic area E as shown in FIGS. 17A and 17B, it is possible to detect each of the main subject areas T1, T2, T3 and acquire position data on the photographic lens 21 accurately, which improves the AF accuracy.

Since the timing of acquiring the lens position is set so as to correspond to the AF area selected by multi AF as shown in FIG. 17C, it is possible to acquire position data on the photographic lens 21 accurately and therefore improve the AF accuracy.

Next, a third embodiment of the invention will be explained with reference to the accompanying drawings.

In the third embodiment, spot AF, that is, an AF mode in which the photographer sets an AF area, in an imaging apparatus with a rolling shutter function will be explained.

FIGS. 14A and 14B show a plurality of AF areas the photographer can set. The function of allowing the photographer to select a desired one from the plurality of AF areas and performing AF in the selected AF area is generally provided as "spot AF." For example, FIG. 14A shows that AF area 1 has been selected. FIG. 14B shows that AF area 11 has been selected.

As shown in FIG. 18, the BCPU 60 has a focusing area setting section 60-4. The focusing area setting section 60-4 sets an AF area where the imaging device unit 54 performs focusing in the photographic area E according to external manual operation such as that by the user.

The first transmission section 60-2 of the BCPU 60 sets the timing of acquiring position data to either the rising edge or falling edge of or both edges of the synchronization signal BL_SYNC on the basis of the position of the AF area in the photographic area E where focusing is performed set by the focusing area setting section 60-4.

The first transmission section 60-2 sets the timing of synchronization signal BL_SYNC to the exposure timing of the line part corresponding to the central part of the AF area where focusing is performed set by the focusing area setting section 60-4.

The first transmission section 60-2 of the BCPU 60 sets the timing of acquiring position data to, for example, the rising edge of the synchronization signal BL_SYNC on the basis of the position of the AF area in the photographic area E where focusing is performed set by the focusing area setting section 60-4.

For example, when the position of the AF area in the photographic area E is set to the central part of the photographic area E, the first transmission section 60-2 of the BCPU 60 sets the synchronization signal BL_SYNC so that the signal may go high, for example, at the midpoint of the exposure period of the central line L20 in the imaging device lines of the imaging device unit 54 as shown in FIG. 19.

If the position of the AF area in the photographic area E is not set in the central part of the photographic area E but in another position, the first transmission section 60-2 of the BCPU 60 sets the synchronization signal BL_SYNC so that the signal may go high, for example, at the midpoint of the exposure period of a line corresponding to another AF area of the imaging device lines of the imaging device unit 54.

Next, the LCPU 30 determines whether the synchronization signal BL_SYNC sent from the BCPU 60 has gone high. If the result of the determination has shown that the synchronization signal BL_SYNC has gone high, the position detection section 30-2 detects position data on the photographic lens 21 on the optical axis P at the midpoint of the exposure period of line L20 in the imaging device lines when the synchronization signal BL_SYNC has gone high. Next, the LCPU 30 stores position data on the photographic lens 21 on the optical axis P in the buffer memory 30-1.

From this point on, the LCPU 30 causes the position detection section 30-2 to detect each item of position data on the photographic lens 21 on the optical axis P at the time when the synchronization signal BL_SYNC goes high and stores the items of position data in the buffer memory 30-1. Having received commands to acquire position data on the photographic lens 21 sequentially, the LCPU 30 transmits the items of position data on the photographic lens 21 stored in the buffer memory 30-1 to the body unit 11 sequentially.

As described above, even in the AF mode in which the photographer sets an AF area in the imaging apparatus with the rolling shutter function, it is possible to accurately acquire position data on the photographic lens 21 corresponding to the set AF area and improve the AF accuracy.

The third embodiment may be modified as follows.

For example, although the number of AF areas in multi AF is 11, the invention is not limited to this. For instance, more than 11 AF areas may be used.

The imaging devices may be CCD, CMOS sensors, or MOS sensors. The exposure period of the imaging device may extend over a plurality of vertical synchronization signals (VD).

The exposure period in the imaging apparatus may be set to the timing shown in, for example, each of FIGS. 20 and 21. FIG. 20 shows an exposure period in the case of a global shutter. The synchronization signal BL_SYNC is set so as to go high or low in response to the start or end of exposure. In FIG. 20, exposure is started each time the synchronization signal BL_SYNC goes high and is terminated each time the synchronization signal BL_SYNC goes low.

FIG. 21 shows an exposure period in the case of a rolling shutter. The synchronization signal BL_SYNC is set so as to go high or low in response to the start or end of exposure of a line corresponding to the AF area. FIG. 21 shows a case where there are two lines corresponding to the AF area. For example, when the exposure of a first line is started, the synchronization signal BL_SYNC goes high. Then, when the exposure of a second line is started, the synchronization signal BL_SYNC goes low. Next, when the exposure of the first line is terminated, the synchronization signal BL_SYNC goes high. Then, when the exposure of the second line is terminated, the synchronization signal BL_SYNC goes low.

Next, a fourth embodiment of the invention will be explained with reference to the accompanying drawings.

The fourth embodiment is related to data communication between the BCPU 60 and LCPU 30. The data communication is carried out by, for example, the following method.

Figure 22:
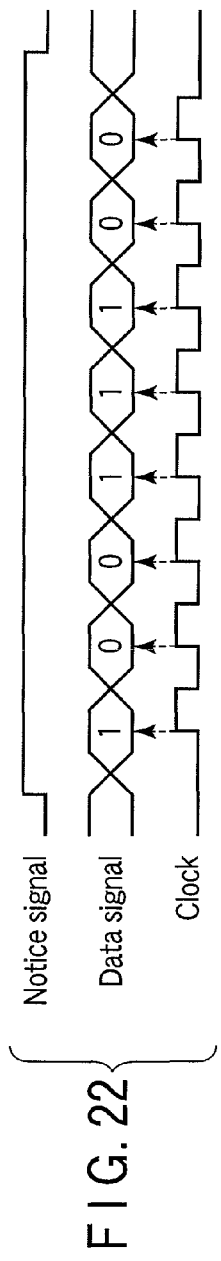
FIG. 22 shows an example of a method of data communication between BCPU and LCPU in the imaging apparatus.

FIG. 22 shows a protocol generally known as synchronous serial communication. In synchronous serial communication, a notice signal is transmitted and, at the same time, a clock is generated. Data, including position data on the photographic lens 21, is transmitted in synchronization with the clock during the period that the notice signal is high.

In the third embodiment, the BCPU 60 (on the body side) acts as a master and starts command communication. At this time, the BCPU 60 issues a command with arbitrary timing.

Figure 23:
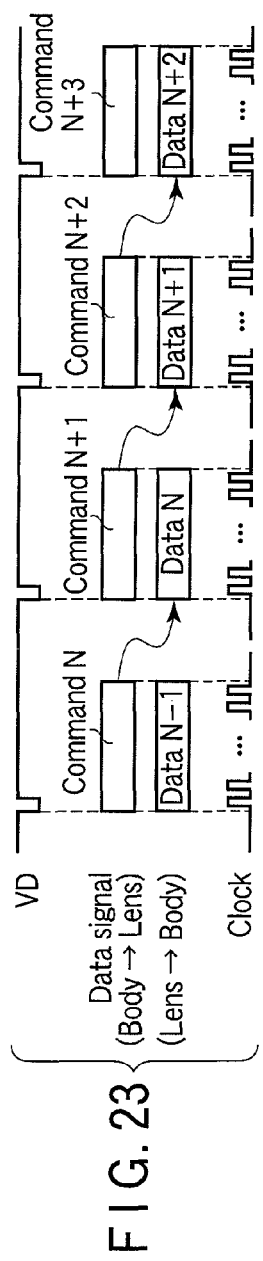
FIG. 23 shows another example of the method of data communication between the BCPU and LCPU in the imaging apparatus.

FIG. 23 shows an example of never failing to perform data communication in synchronization with a vertical synchronization signal (VD). In this data communication, a vertical synchronization signal VD with a specific period is generated. At the same time, a clock is generated each time the vertical synchronization signal VD goes low. The BCPU 60 requests data or transmits a command N to specify the setting of a lens operation and the driving of the lens.

According to the command N, the LCPU 30 transmits data, such as position data on the photographic lens 21. For example, if the BCPU 60 transmits a command N to request lens position data to the LCPU 30, the LCPU 30 will transmit data corresponding to the command N, such as position data on the photographic lens 21, in synchronization with the vertical synchronization signal VD.

The clock is output from either the BCPU 60 or LCPU 30.

Figure 24:
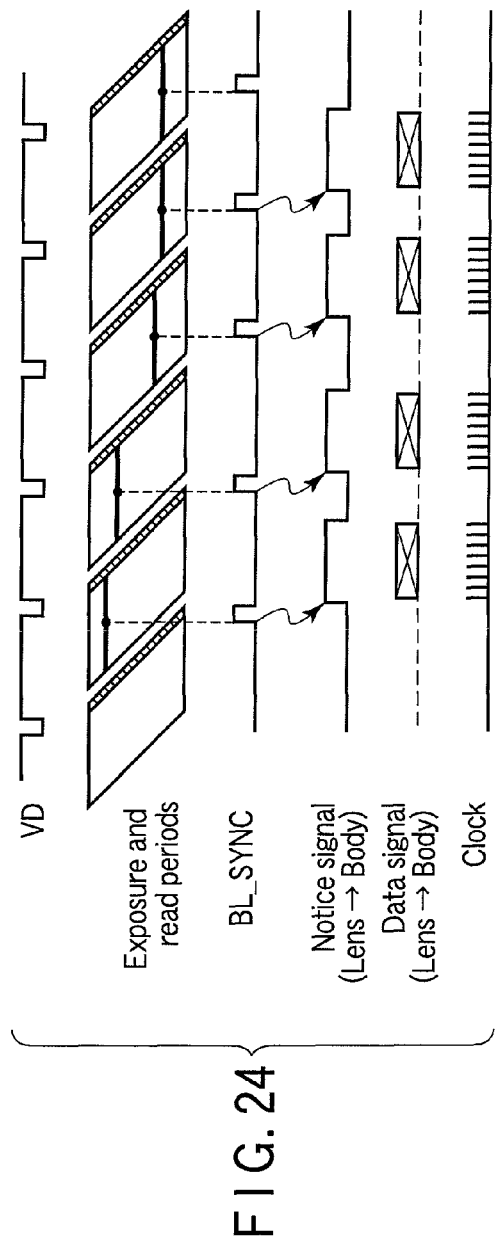
FIG. 24 shows still another example of the method of data communication between the BCPU and LCPU in the imaging apparatus.

FIG. 24 shows a case where the LCPU 30 (on the lens side) acts as a master. The BCPU 60 generates not only a clock in synchronization with the vertical synchronization signal VD but also a synchronization signal BL_SYNC. Immediately after having acquired position data in response to a change in the synchronization signal BL_SYNC, the LCPU 30 starts to perform communication. After starting to perform communication, the LCPU 30 generates a notice signal and transmits data, such as position data on the photographic lens 21, in synchronization with the clock during the period when the notice signal is high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and
a second transmission section for transmitting position data on the focusing lens detected by the position detection section to the camera body,
wherein the synchronization signal has the same period as a vertical synchronization signal of the imaging device and has shifted in phase from the vertical synchronization signal.

2. The imaging apparatus according to claim 1, wherein the first transmission section changes the phase shift according to a photographic condition for the imaging device.

3. The imaging apparatus according to claim 2, wherein the first transmission section changes the phase shift according to an exposure time of the imaging device as the photographic condition for the imaging device.

4. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and
a second transmission section for transmitting position data on the focusing lens detected by the position detection section to the camera body,
wherein the first transmission section sets the synchronization signal at the time corresponding to the midpoint of the exposure period of the imaging device.

5. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and
a second transmission section for transmitting position data on the focusing lens detected by the position detection section to the camera body,
wherein the first transmission section sets the synchronization signal at the time corresponding to the start of the exposure period of the imaging device.

6. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and
a second transmission section for transmitting position data on the focusing lens detected by the position detection section to the camera body,
wherein the first transmission section sets the synchronization signal at the time corresponding to the end of the exposure period of the imaging device.

7. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and
a second transmission section for transmitting position data on the focusing lens detected by the position detection section to the camera body,
wherein the first transmission section transmits to the lens unit the synchronization signal independently of the vertical synchronization signal of the imaging device.

8. An imaging apparatus comprising:
a camera body; and
a lens unit which has a focusing lens for adjusting a focal position to bring a subject image into focus and which can be mounted on and removed from the camera body,
the camera body including
an imaging device which photographs a subject image formed by the lens unit,
a control section for generating an instruction to provide movement control of the focusing lens along an optical axis, and
a first transmission section for transmitting to the lens unit the instruction generated by the control section and a synchronization signal in response to the photographic timing of the imaging device, and
the lens unit including
a lens control section for moving the focusing lens along the optical axis according to the instruction generated by the control section,
a position detection section for detecting the position of the focusing lens on the optical axis in response to the synchronization signal, and a second transmission section for transmitting position data on the focusing lens detected by the position detection section to the camera body, wherein the position detection section detects a plurality of items of the position data on the focusing lens sequentially in response to the synchronization signal, wherein the lens unit includes a storage section for sequentially storing the plurality of items of position data on the focusing lens detected by the position detection section, wherein the second transmission section, when receiving a specific one of the instructions generated by the control section transmitted from the first transmission section, transmits to the camera body a part of or all of the plurality of items of position data on the focusing lens stored in the storage section, and wherein the second transmission section sequentially transmits the position data on the focusing lens stored in the storage section each time each item of position data is acquired.

9. An imaging apparatus comprising:

a camera body; and a lens unit which has a focusing lens for adjusting a focal position to bring a subject image into focus and which can be mounted on and removed from the camera body, the camera body including an imaging section which has pixels including imaging devices arranged in a plurality of lines, each line including a plurality of imaging devices, and which takes a picture so as to shift an exposure period at intervals of a specific number of lines, a control section for generating an instruction to provide movement control of the focusing lens along an optical axis to perform focusing, a first transmission section for transmitting to the lens unit the instruction generated by the control section and a synchronization signal in response to specific exposure timing of the imaging device, and a subject data acquisition section for acquiring data on a subject on the basis of an imaging output of the imaging device, and the lens unit including a lens control section for moving the focusing lens along the optical axis according to the instruction generated by the control section, a position detection section for detecting the position of the focusing lens on the optical axis in response to the synchronization signal, and a second transmission section for transmitting position data on the focusing lens detected by the position detection section to the camera body, wherein the control section performs focusing by controlling the movement of the focusing lens along the optical axis on the basis of the position data on the focusing lens, and the first transmission section sets the timing of the synchronization signal on the basis of the data on the subject acquired by the subject data acquisition section.

10. The imaging apparatus according to claim 9, wherein the subject data acquisition section detects a main subject in a photographic area of the imaging section, and the first transmission section sets exposure timing of a line part of the imaging section corresponding to the position of the main subject detected by the subject data acquisition section to the timing of the synchronization signal.

11. The imaging apparatus according to claim 10, wherein the subject data acquisition section detects the main subject moving in the photographic area.

12. The imaging apparatus according to claim 10, wherein the subject data acquisition section detects a plurality of main subjects exiting in the photographic area.

13. The imaging apparatus according to claim 9, wherein the first transmission section sets the timing of the rising edge of and that of the falling edge of the synchronization signal on the basis of the subject data acquired by the subject data acquisition section, and the position detection section detects the position of the focusing lens in synchronization with the rising edge and falling edge of the synchronization signal.

14. An imaging apparatus comprising:

a camera body; and a lens unit which has a focusing lens for adjusting a focal position to bring a subject image into focus and which can be mounted on and removed from the camera body, the camera body including an imaging section which has pixels including imaging devices arranged in a plurality of lines, each line including a plurality of imaging devices, and which takes a picture so as to shift an exposure period at intervals of a specific number of lines, a control section for generating an instruction to provide movement control of the focusing lens along an optical axis to perform focusing, a first transmission section for transmitting to the lens unit the instruction generated by the control section and a synchronization signal in response to specific photographic timing of the imaging device, and a focusing area setting section for setting an area where focusing is performed in a photographic area of the imaging device, and the lens unit including a lens control section for moving the focusing lens along the optical axis according to the instruction generated by the control section, a position detection section for detecting the position of the focusing lens on the optical axis in response to the synchronization signal, and a second transmission section for transmitting position data on the focusing lens detected by the position detection section to the camera body, wherein the control section performs focusing by controlling the movement of the focusing lens along the optical axis on the basis of the position data on the focusing lens, and the first transmission section sets the timing of the synchronization signal on the basis of the area where the focusing is performed set by the focusing area setting section.

15. The imaging apparatus according to claim 14, wherein the first transmission section sets the timing of the synchronization signal at the time of exposure timing of the line part corresponding to the central part of the area where the focusing is performed set by the focusing area setting section.

16. The imaging apparatus according to claim 14, wherein the focusing area setting section has a spot AF mode in which the area where focusing is performed in the photographic area is set according to an external operation instruction.

17. The imaging apparatus according to claim 14, wherein the first transmission section sets the timing of the rising edge of and that of the falling edge of the synchronization signal on the basis of the area where the focusing is performed set by the focus area setting section, and the position detection section detects the position of the focusing lens in synchronization with the rising edge and falling edge of the synchronization signal.

* * * * *